(12) United States Patent
Yao

(10) Patent No.: US 11,650,296 B2
(45) Date of Patent: May 16, 2023

(54) OPTICAL SENSING BASED ON WAVELENGTH DIVISION MULTIPLEXED (WDM) LIGHT AT DIFFERENT WAVELENGTHS IN LIGHT DETECTION AND RANGING LIDAR SYSTEMS

(71) Applicant: Xiaotian Steve Yao, Huntington Beach, CA (US)

(72) Inventor: Xiaotian Steve Yao, Huntington Beach, CA (US)

(*) Notice: Subject to any disclaimer, the term of this patent is extended or adjusted under 35 U.S.C. 154(b) by 1094 days.

(21) Appl. No.: 16/279,586

(22) Filed: Feb. 19, 2019

(65) Prior Publication Data

US 2019/0257927 A1 Aug. 22, 2019

Related U.S. Application Data

(60) Provisional application No. 62/710,577, filed on Feb. 16, 2018.

(51) Int. Cl.
| | |
|---|---|
| G01S 7/481 | (2006.01) |
| G01S 7/4863 | (2020.01) |
| G01S 7/4865 | (2020.01) |
| G01S 17/88 | (2006.01) |
| G01S 7/484 | (2006.01) |
| G01S 17/26 | (2020.01) |
| G01S 17/89 | (2020.01) |

(52) U.S. Cl.
CPC ............ *G01S 7/4818* (2013.01); *G01S 7/484* (2013.01); *G01S 7/4811* (2013.01); *G01S 7/4863* (2013.01); *G01S 7/4865* (2013.01); *G01S 17/26* (2020.01); *G01S 17/88* (2013.01); *G01S 17/89* (2013.01)

(58) Field of Classification Search
None
See application file for complete search history.

(56) References Cited

U.S. PATENT DOCUMENTS

| | | | |
|---|---|---|---|
| 5,359,409 | A | 10/1994 | Wildnauer et al. |
| 5,723,856 | A | 3/1998 | Yao et al. |
| 5,777,778 | A | 7/1998 | Yao |
| 5,917,179 | A | 6/1999 | Yao |
| 5,929,430 | A | 7/1999 | Yao et al. |
| 6,387,197 | B1 | 5/2002 | Bewlay et al. |
| 6,417,957 | B1 | 7/2002 | Xiaotian |
| 6,476,959 | B2 | 11/2002 | Yao |
| 6,487,336 | B1 | 11/2002 | Yao |

(Continued)

FOREIGN PATENT DOCUMENTS

WO 2019161388 A1 8/2019

OTHER PUBLICATIONS

LiDAR drives forwards, Nature Photon 12, 441 (2018).

(Continued)

*Primary Examiner* — Yuqing Xiao
*Assistant Examiner* — Jempson Noel
(74) *Attorney, Agent, or Firm* — Perkins Coie LLP

(57) ABSTRACT

Designs and implementations of light detection and ranging (LiDAR) systems that project light at a set of different wavelength division multiplexed (WDM) wavelengths based on WDM optical designs to reduce the number of components, complexity of LiDAR optical systems, the weight and cost of LiDAR systems for a wide range of applications.

34 Claims, 18 Drawing Sheets

Wavelength division multiplexing (WDM) LiDAR with low cost

(56) References Cited

U.S. PATENT DOCUMENTS

| | | | |
|---|---|---|---|
| 6,567,436 | B1 | 5/2003 | Yao et al. |
| 6,580,532 | B1 | 6/2003 | Yao et al. |
| 6,795,481 | B2 | 9/2004 | Maleki et al. |
| 6,873,631 | B2 | 3/2005 | Yao et al. |
| 7,061,657 | B1 | 6/2006 | Fishman et al. |
| 9,689,968 | B2 * | 6/2017 | Zou .................... G01S 7/282 |
| 2003/0160148 | A1 * | 8/2003 | Yao .................... H01S 5/0683 359/245 |
| 2007/0233396 | A1 * | 10/2007 | Tearney ............... G02B 23/243 702/19 |
| 2008/0074640 | A1 * | 3/2008 | Walsh .................. G01S 7/4865 356/5.01 |
| 2017/0155225 | A1 * | 6/2017 | Villeneuve .......... H01S 3/06758 |
| 2017/0184450 | A1 * | 6/2017 | Doylend ................ G01S 17/42 |
| 2017/0307648 | A1 * | 10/2017 | Kotake ................. G01S 17/58 |
| 2018/0224547 | A1 * | 8/2018 | Crouch ................. G01S 17/42 |
| 2018/0306925 | A1 * | 10/2018 | Hosseini ............... G01S 17/42 |
| 2019/0204419 | A1 * | 7/2019 | Baba ..................... G02B 6/124 |
| 2019/0250253 | A1 * | 8/2019 | Hung .................... G01S 17/42 |

OTHER PUBLICATIONS

Amann, Markus-Christian, et al., "Laser ranging: a critical review of usual techniques for distance measurement," Opt. Eng. 40(1), 10-19 (2001).

Chang, Lin, et al., "Ultra-efficient frequency comb generation in AlGaAs-on-insulator microresonators," Nat. Commun. 11, 1331 (2020).

Choi, Jaebum, et al., "Multi-target tracking using a 3D-Lidar sensor for autonomous vehicles," 16th International IEEE Conference on Intelligent Transportation Systems (ITSC 2013), The Hague, 2013, pp. 881-886.

Diddams, Scott A., et al., "Optical frequency combs: Coherently uniting the electromagnetic spectrum," Science, 369 (6501), eaay3676 (2020).

Duan, P., et al., "Chip-to-chip interconnects based on 3D stacking of optoelectrical dies on Si," Proc. SPIE 8267, Optoelectronic Interconnects XII, 82670U (2012).

Feneyrou, P., et al., "Frequency-modulated multifunction lidar for anemometry, range finding, and velocimetry-1. Theory and signal processing," Appl. Opt. 56, 9663-9675 (2017).

Heck, Martijn J.R., "Highly integrated optical phased arrays: photonic integrated circuits for optical beam shaping and beam steering," Nanophotonics 6 (1), 93-107 (2017).

Hibino, Yoshinori, "Recent advances in high-density and large-scale AWG multi/demultiplexers with higher index-contrast silica-based PLCs," IEEE J. Select. Topics Quantum Electron, 8(6), 1090-1101 (2002).

Holmström, Sven T. S., et al., "MEMS laser scanners: a review,"J. Microelectromech. Syst., 23(2), 259-275(2014).

International Search Report and Written Opinion dated May 24, 2019 for International Patent Application No. PCT/US2019/018585.

Jiang, Yunshan, et al., "Time-stretch LiDAR as a spectrally scanned time of-flight ranging camera," Nat. Photon. 14, 14-18(2020).

Jingye, Chen, et al., "Research progress in solid-state LiDAR," Opto-Electronic Engineering, 46(7), 190218, (2019).

Jirauschek, Christian, et al., "A theoretical description of Fourier domain mode locked lasers," Opt. Express 17, 24013-24019 (2009).

Johnson, Steven, et al., "Analysis of Geiger-mode APD laser radars," Proc. SPIE 5086, Laser Radar Technology and Applications VIII, (2003).

Karpf, Sebastian, et al., "Fourier-domain mode-locked laser combined with a master-oscillator power amplifier architecture," Opt. Lett. 44, 1952-1955 (2019).

Kimoto, Katsumi, et al., "Development of small size 3D LIDAR," IEEE International Conference on Robotics and Automation (ICRA), Hong Kong, 2014, pp. 4620-462.

Konoike, R., et al., "SOA-Integrated silicon photonics switch and its lossless multistage transmission of high-capacity WDM signals," J Lightwave Technol, 37(1), 123-130 (2019).

Lalonde, Jean-Francois, et al., "Natural terrain classification using three-dimensional ladar data for ground robot mobility," J. Field Robot. 23, 839-861 (2006).

Lee, Benjamin G., et al., Silicon Photonic Switch Fabrics: Technology and Architecture, J. Lightwave Technology, 37 (1), 2018.

Lin, Yi, et al., "Mini-UAV-Borne LIDAR for fine-scale mapping," IEEE Geosci. Remote Sens. Lett. 8(3), 426-430, (2011).

MacDonald, R. I. "Frequency domain optical reflectometer," Appl. Opt. 20, 1840-1844 (1981).

McManamon, Paul F., et al., "Comparison of flash lidar detector options," Opt. Eng. 56(3), 031223 (2017).

Mizumoto, T., et al., "Verification of waveguide-type optical circulator operation," Electronics Letters, 26(3), 199-200 (1990).

Moss, Robert, et al., "Low-cost compact MEMS scanning ladar system for robotic applications," Proc. SPIE 8379, Laser Radar Technology and Applications XVII, 837903 (2012).

Nguyen, Nam-Trung, "Micro-optofluidic lenses: a review," Biomicrofluidics, 4(3), 031501 (2010).

Okano, Masayuki, et al., "Swept Source Lidar: simultaneous FMCW ranging and nonmechanical beam steering with a wideband swept source," Opt. Express 28, 23898-23915 (2020).

Poulton, Christopher V., et al., "Coherent solid-state LIDAR with silicon photonic optical phased arrays," Opt. Lett. 42, 4091-4094 (2017).

Raja, Arslan S., et al., "Electrically pumped photonic integrated soliton microcomb," Nat Commun 10, 680 (2019).

Shen, Boqiang et al., "Integrated turnkey soliton microcombs," Nature 582, 365-369 (2020).

Sugimoto, N., et al., "Waveguide polarization—independent optical circulator," IEEE Photon. Technol. Lett. 11, 355-357 (1999).

Svelto, Orazio "Principles of Lasers", Ray and wave propagation through optical media, 5th ed. (Springer-Verlag US 2010), 150-161.

Tateda, Mitsuhiro, et al., "Advances in optical time-domain reflectometry," J. Lightwave Technol, 7(8), 1217-1224(1989).

Tyler, Nicola A., et al., "SiN integrated optical phased arrays for two-dimensional beam steering at a single near-infrared wavelength," Opt. Express 27, 5851-5858 (2019).

Wang, Jian, et al., "On-chip silicon photonic signaling and processing: a review," Sci. Bull., 63(19), 1267-1310 (2018).

Whyte, Refael, et al., "Application of lidar techniques to time-of-flight range imaging," Appl. Opt. 54, 9654-9664 (2015).

Yang, Ki Youl, et al., "Inverse-designed non-reciprocal pulse router for chip-based LiDAR," Nat. photonics 14, 369-374 (2020).

Yao, X. Steve, et al., "Coupled opto-electronic oscillators for generating both RF signals and optical pulses," J. of Lightwave Tech., 18, 73 (2000).

Yoo, H. W., et al., "MEMS-based lidar for autonomous driving," Elektrotech. Inftech. 135, 408-415 (2018).

Zadka, Moshe, et al., "On-chip platform for a phased array with minimal beam divergence and wide field-of-view," Opt. Express 26, 2528-2534 (2018).

Zhou, Guoqing, et al., "Flash Lidar sensor using fiber-coupled APDs," IEEE Sensors Journal, 15(9), 4758-4768 (2015).

\* cited by examiner

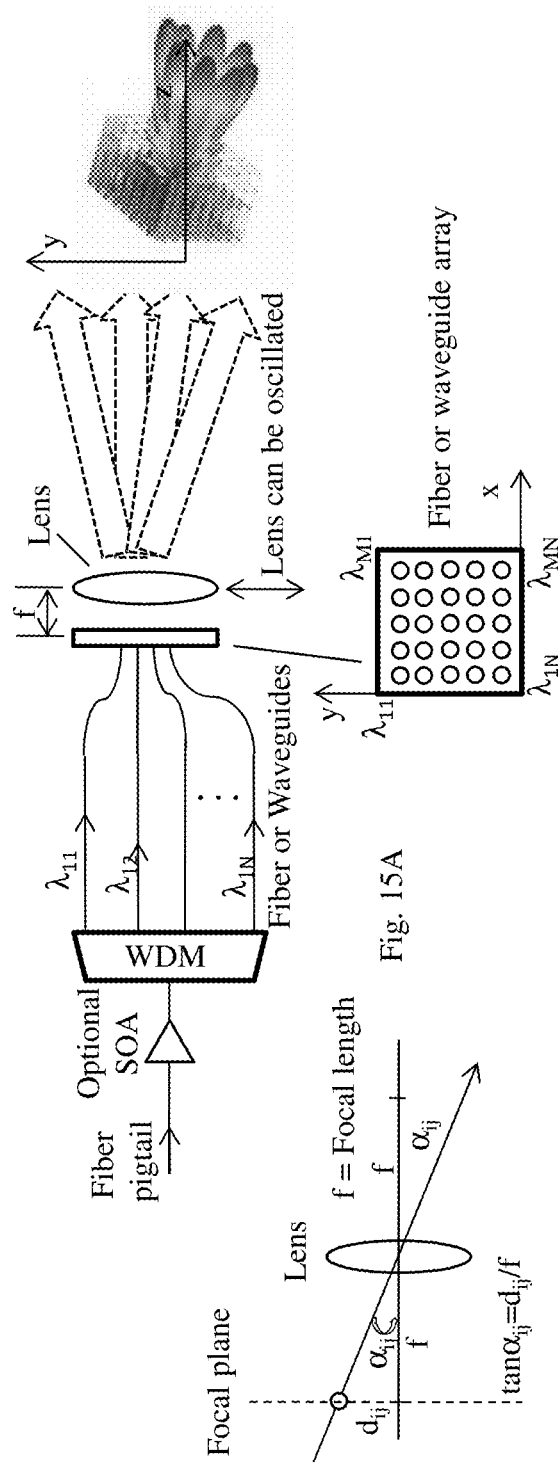

OPTICAL SENSING BASED ON WAVELENGTH DIVISION MULTIPLEXED (WDM) LIGHT AT DIFFERENT WAVELENGTHS IN LIGHT DETECTION AND RANGING LIDAR SYSTEMS

CROSS-REFERENCE TO RELATED APPLICATIONS

This application claims the priority to and benefits of U.S. Provisional Patent Application No. 62/710,577 entitled "OPTICAL SENSING BASED ON WAVELENGTH DIVISION MULTIPLEXED (WDM) LIGHT AT DIFFERENT WAVELENGTHS IN LIGHT DETECTION AND RANGING LIDAR SYSTEMS" and filed Feb. 16, 2018, which is incorporated by reference herein in its entirety.

TECHNICAL FIELD

The technology disclosed in this patent document relates to devices, systems or techniques for implementing optical sensing in light detection and ranging (LiDAR) applications.

BACKGROUND

A light detection and ranging (LiDAR) system is used to generate probe light (e.g., laser light) for illuminating a target and to detect the returned probe light from the target to measure a distance to the target. A LiDAR system can be used in a wide range of applications including autonomous vehicles for obstacle detection and avoidance to navigate safely through environments, using scanning laser beams. Many LiDARs are operated by sensing out a pulsed laser beam and measuring reflected pulsed light. The distance of an object can be determined by measuring the relative delay in time between the outgoing pulse and the corresponding returned pulse.

SUMMARY

This patent documents provides designs and implementations of light detection and ranging (LiDAR) systems that project light at a set of different wavelength division multiplexed (WDM) wavelengths based on WDM optical designs to reduce the number of components, complexity of LiDAR optical systems, the weight and cost of LiDAR systems for a wide range of applications.

In one aspect, the disclosed technology can be implemented to provide a light detection and ranging (LiDAR) system to include an optical transmitter module to produce probe light at different optical wavelengths that can be used for wavelength division multiplexing (WDM); an optical fiber link coupled to the optical transmitter module to receive the probe light; an optical beamforming module coupled to receive the combination optical beam from the optical fiber link and operable to separate the probe light into different optical probe beams at the different WDM wavelengths and to project the different optical probe beams to different directions for LiDAR sensing; a motor engaged to cause the optical collimator and the optical diffraction grating to rotate together to scan the different optical probe beams at different beam directions and at the different WDM wavelengths for LiDAR sensing while maintaining optical alignment with each other that are aligned relative to each other, an optical receiver module coupled to receive returned probe light via the fiber link from the optical beamforming module and including a WDM demultiplexer to separate the returned probe light into the different returned optical probe beams at the different WDM wavelengths, respectively, and different optical detectors that are placed to receive and detect the different returned optical probe beams at the different WDM wavelengths, respectively; and an optical circulator coupled to the optical fiber link, the optical transmitter module, the optical receiver module and the optical beamforming module to direct light from the optical transmitter module to the optical beamforming module, light from the beamforming module to the optical receiver module.

In another aspect, the disclosed technology can be implemented to provide a method for performing light detection and ranging to include generating a combined optical beam including light at different WDM wavelengths; modulating the combined optical beam with a modulation signal referenced to a system clock; demultiplexing the modulated combined beam into different optical probe beams at the different WDM wavelengths; projecting the different optical probe beams at the different WDM wavelengths into different directions in space to optically probe a surrounding; receiving reflected probe beams at the different WDM wavelengths from the surrounding to combine reflected probe beams into a combined reflected probe beam; directing the combined reflected probe beam to an optical receiver module which separates the combined reflected probe beam into different reflected optical probe beams at the different WDM wavelengths along different optical paths leading to different photoreactors to produce different detector signals; processing the detector signals based on the system clock to determine distances of reflecting objects in the surrounding to cause the reflected probe beams; and using the determined distances to determine positions of the reflecting objects in space.

In another aspect, the disclosed technology can be implemented to provide a light detection and ranging (LiDAR) system to include an optical transmitter module that produces a combination optical beam which combines light at different wavelength division multiplexed (WDM) wavelengths; an optical fiber link coupled to the optical transmitter module to receive the combination optical beam from the optical fiber link; and an optical beamforming module coupled to receive the combination optical beam from the optical fiber link and operable to project different optical probe beams at the different WDM wavelengths for LiDAR sensing. The optical beamforming module includes an optical collimator and an optical diffraction grating that are aligned relative to each other to transmit light therebetween so that the combination optical beam is received by the optical collimator and is directed by the optical collimator to the optical diffraction grating that separates the combination optical beam into the different optical probe beams at the different WDM wavelengths, respectively, at different beam directions, and wherein the optical beamforming module further receives returned probe light and directs the returned probe light from the optical diffraction grating to the optical collimator. This system further includes a motor engaged to cause the optical collimator and the optical diffraction grating to rotate together to scan the different optical probe beams at different beam directions and at the different WDM wavelengths for LiDAR sensing while maintaining optical alignment with each other that are aligned relative to each other, an optical receiver module coupled to receive returned probe light via the fiber link from the optical collimator in the optical beamforming module and including a WDM demultiplexer to separate the returned probe light into the different returned optical probe beams at the different WDM wavelengths, respectively, and different optical detectors that are placed to receive and detect the different returned optical probe beams at the different WDM wavelengths, respectively; and an optical circulator coupled to the optical fiber link, the optical transmitter module, the optical receiver module and the optical beamforming module to direct light from the optical transmitter module to the optical beamforming module, light from the beamforming module to the optical receiver module.

In another aspect, the disclosed technology can be implemented to provide a light detection and ranging (LiDAR) system that includes an optical transmitter module that produces a combination optical beam which combines light at different wavelength division multiplexed (WDM) wavelengths; an optical fiber link coupled to the optical transmitter module to receive the combination optical beam from the optical fiber link; and an optical beamforming module coupled to receive the combination optical beam from the optical fiber link and operable to project different optical probe beams at the different WDM wavelengths for LiDAR sensing. The optical beamforming module includes a WDM demultiplexer that separates the combination optical beam into the different optical probe beams at the different WDM wavelengths, respectively, different optical waveguides or fiber lines coupled to receive the different optical probe beams at the different WDM wavelengths, respectively, a lens array of optical lenses that are respectively coupled to the optical waveguides or fibers with varying spatial offsets to optic axes of the optical lenses to cause the lenses to project received optical probe beams at different output beam directions, and wherein the optical beamforming module further receives returned probe light and directs the returned probe light to the WDM demultiplexer via the different optical waveguides or fiber lines to be combined in the optical fiber link. This system further includes a motor engaged to cause the optical collimator and the optical diffraction grating to rotate together to scan the different optical probe beams at different beam directions and at the different WDM wavelengths for LiDAR sensing while maintaining optical alignment with each other that are aligned relative to each other; an optical receiver module coupled to receive returned probe light via the fiber link from the optical collimator in the optical beamforming module and including a WDM demultiplexer to separate the returned probe light into the different returned optical probe beams at the different WDM wavelengths, respectively, and different optical detectors that are placed to receive and detect the different returned optical probe beams at the different WDM wavelengths, respectively; and an optical circulator coupled to the optical fiber link, the optical transmitter module, the optical receiver module and the optical beamforming module to direct light from the optical transmitter module to the optical beamforming module, light from the beamforming module to the optical receiver module.

In another aspect, the disclosed technology can be implemented to provide alight detection and ranging (LiDAR) system which includes an optical transmitter module that produces a combination optical beam which combines light at different wavelength division multiplexed (WDM) wavelengths; an optical fiber link coupled to the optical transmitter module to receive the combination optical beam from the optical fiber link; and an optical beamforming module coupled to receive the combination optical beam from the optical fiber link and operable to project different optical probe beams at the different WDM wavelengths for LiDAR sensing. The optical beamforming module includes a WDM demultiplexer that separates the combination optical beam into the different optical probe beams at the different WDM wavelengths, respectively, different optical waveguides or fiber lines coupled to receive the different optical probe beams at the different WDM wavelengths, respectively, an optical lens that is coupled to the optical waveguides or fiber lines with varying spatial offsets to an optic axis of the optical lens to cause the optical lens to project received optical probe beams at different output beam directions, and wherein the optical beamforming module further receives returned probe light via the optical lens and directs the returned probe light to the WDM demultiplexer via the different optical waveguides or fiber lines to be combined in the optical fiber link. This system further includes a motor engaged to cause the optical collimator and the optical diffraction grating to rotate together to scan the different optical probe beams at different beam directions and at the different WDM wavelengths for LiDAR sensing while maintaining optical alignment with each other that are aligned relative to each other; an optical receiver module coupled to receive returned probe light via the fiber link from the optical collimator in the optical beamforming module and including a WDM demultiplexer to separate the returned probe light into the different returned optical probe beams at the different WDM wavelengths, respectively, and different optical detectors that are placed to receive and detect the different returned optical probe beams at the different WDM wavelengths, respectively; and an optical circulator coupled to the optical fiber link, the optical transmitter module, the optical receiver module and the optical beamforming module to direct light from the optical transmitter module to the optical beamforming module, light from the beamforming module to the optical receiver module.

In yet another aspect, the disclosed technology can be implemented to provide a light detection and ranging (LiDAR) system that includes different identical optical transmitter modules, each producing an optical beam combining light at a set of different wavelength division multiplexed (WDM) wavelengths; different optical fiber links coupled to the optical transmitter modules to receive, respectively, the different optical beams; and different optical beamforming modules located at different positions and coupled to the different optical fiber links, respectively. Each optical beamforming module is located and oriented to project an optical beam from one coupled optical fiber link as a 3-dimensional cone of different probe beams at the different WDM wavelengths, respectively, for LiDAR sensing. The different optical beamforming modules at the different locations are oriented to project respective 3-dimensional cone of different probe beams at the different WDM wavelengths at different directions for LiDAR sensing and to receive returned probe light. This system further includes different optical receiver modules respectively coupled to receive returned probe light via the different fiber links from the different optical beamforming modules and including a WDM demultiplexer to separate the returned probe light into the different returned optical probe beams at the different WDM wavelengths, respectively, and different optical detectors that are placed to receive and detect the different returned optical probe beams at the different WDM wavelengths, respectively. Each optical beamforming module includes (1) an optical WDM demultiplexer coupled to a corresponding optical fiber link to separate received return probe light into the different optical probe beams at the different WDM wavelengths, respectively, (2) an array of fiber lines or waveguides coupled to receive, from the optical WDM demultiplexer, the different optical probe beams at the different WDM wavelengths, respectively. (3) a projection lens located to receive, from the array of fiber lines or waveguides, the different optical probe beams at the different WDM wavelengths to project the received different optical probe beams at the different WDM wavelengths out as a 3-dimensional cone of probe beams for LiDAR sensing while maintaining optical beamforming module at a fixed position without moving any part of optical beamforming module for the LiDAR sensing.

The above aspects of the disclosed technology can be implemented in various ways. In one implementation, for example, the optical transmitter module includes different lasers to produce laser light at different wavelength division multiplexed (WDM) wavelengths; a WDM multiplexer coupled to receive the laser light from the different lasers to combine the laser light at different wavelength division multiplexed (WDM) wavelengths into a single WDM beam; and an opto-electronic oscillator that includes an electrically controllable optical modulator coupled to receive the single WDM beam output by the WDM multiplexer, an opto-electronic feedback loop that comprises an optical part and an electrical part interconnected by a photodetector to receive a portion of the modulated optical output from the optical modulator and to convert the modulated optical output into an electrical signal to control the optical modulator so that the modulated optical output is modulated to carry an electrical RF or microwave oscillation signal at a radio frequency or microwave frequency. The opto-electronic feedback loop is structured to feed the electrical signal in phase to the optical modulator to generate and sustain both optical modulation and electrical oscillation at the radio frequency or microwave frequency, and a portion of the modulated optical output from the optical modulator of the opto-electronic oscillator is output as the combination optical beam which combines light at different wavelength division multiplexed (WDM) wavelengths.

In another implementation, the optical transmitter module includes an active laser feedback loop with a first loop gain greater than unity and a first loop delay to generate a laser oscillation and including an electro-optical gain element that is operable to affect the first loop gain; and an opto-electronic feedback loop coupled with the active laser feedback loop, having a second loop gain greater than unity and a second loop delay greater than the first loop delay. The opto-electronic loop includes an optical delay line having one end coupled to the active laser feedback loop to receive an optical signal indicative of the laser oscillation and another end connected to a photodetector that converts said optical signal into an electrical modulation signal, an RF delay line having one end connected to the photodetector to receive the electrical modulation signal and another end connected to the electro-optical gain element, and an RF bandpass filter connected in the RF delay line, having a center frequency that is substantially equal to a RF beat frequency of different modes of the active laser feedback loop, whereby the active laser feedback loop is mode-locked to produce pulsed laser oscillations.

In yet another implementation, the optical transmitter module includes a substrate; a coupled opto-electronic oscillator formed on or over the substrate. The coupled opto-electronic oscillator includes: a semiconductor optical modulator to modulate an optical beam in response to an electrical modulation signal; an optical microresonator formed on or over the substrate; a first waveguide formed on or over the substrate having a first end to receive a modulated optical signal from the optical modulator, and a second end that has an angled facet coupled to the microresonator via evanescent coupling; a second waveguide formed on or over the substrate and having a first end with an angled facet which is coupled to the microresonator via evanescent coupling; a semiconductor photodetector formed on or over the substrate to receive and convert an optical output from the second waveguide into an electrical signal; and an electrical link coupled between the photodetector and the optical modulator to produce the electrical modulation signal from the electrical signal. At least part of the first and second waveguides is doped to produce an optical gain to produce a laser oscillation in a laser cavity formed by the optical waveguides and the microresonator.

The above aspects, features and their implementations are described in greater detail in the drawings, the description and the claims.

BRIEF DESCRIPTION OF DRAWINGS

FIG. 10 show an example of a WDM based 3D beam forming without moving beams or moving parts. Fiber or waveguide tips corresponding to different wavelengths are arranged in a 2D array. The array is placed on the focal plane of a collimating lens. The light beams from different fiber tips will form a 3D cone. Multiple such beam cones can be put together to cover a bigger space or arranged in a circle to 360 degrees with a vertical FOV. Alternatively, a beam cone can be rotated horizontally to cover 360 azimuth degrees with a vertical FOV, with the advantage of much reduced requirement on the rotational angular resolution. For example, if 3D beam cone has an azimuth FOV of 30 degrees, a rotational angular resolution of 30 degrees is sufficient, requiring only 12 steps for a full 360 degree rotation. In addition, the relative position between the 2D array and the lens can be moved or oscillated in x or y directions for quickly steering the beam cone with a certain range. For example, one may oscillate the lens vertically or horizontally to cause the beam cone to steer vertically or horizontally.

DETAILED DESCRIPTION

In various applications equipped with LiDAR sensors, it is desirable to use a LiDAR sensor to obtain a wide angular view of a surrounding, e.g., a full 360 degree azimuth field of view (FOV), such as a sensing system for assisting a driver in operating a vehicle or in operating a vehicle in an autonomous driving mode without user manual operation. Point cloud outputs from a LiDAR sensor constitute the necessary data for software to perform further processing to determine where potential obstacles exist in the environment of a structure (e.g., a robot) or vehicle to which the LiDAR sensor is mounted and where the robot or vehicle is spatially situated in relation to those potential obstacles.

In some implementations for LiDAR sensing for a vehicle, a LiDAR sensor for autonomous operation or other LiDAR-assisted operations of the vehicle may be mounted at a selected location of the vehicle (e.g., on the top of the vehicle) and is operated to operate a laser in the LiDAR to emit a laser beam while continuously rotating the emitted laser beam to get a full 360 degree azimuth field of view (FOV) of the surroundings. Such a circular line scanning of one laser beam can be used for obtaining a 2D circular point cloud map so as to view objects in a single plane. In other implementations, a LiDAR sensor may include multiple lasers pointing at different vertical angles, respectively, to get sufficient vertical FOV and therefore a 3D circular point cloud map.

Figure 1:
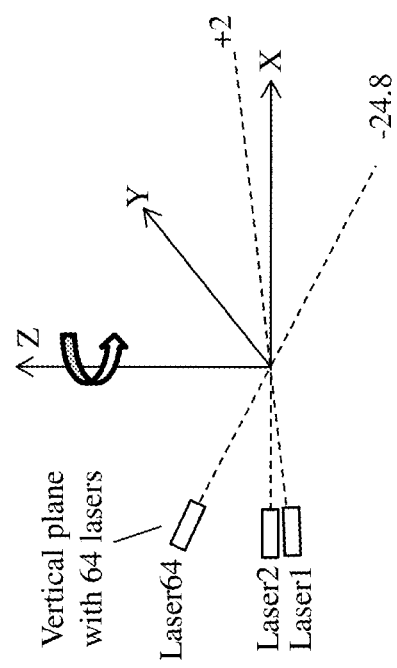
FIG. 1 shows an example of a conventional light detection and ranging (LiDAR) system using 64 lasers pointing at different directions to get 26.8 degrees FOV in the XZ plane. The whole assembly rotates around Z axis to get full 360 azimuth FOV.

For example, FIG. 1 shows an example of a LiDAR sensor that has multiple lasers (e.g., 64 lasers) that are arranged in a vertical plane to point at different directions and each laser is operated to emit probe laser light (e.g., at 905 nm in wavelength) to a pre-selected vertical FOV (e.g., 26.8 degrees). The multiple lasers are oriented in the vertical plane (e.g., XZ pane) with a relatively even crossing angle to cover the pre-selected vertical FOV (e.g., 26.8 degrees) in the XZ plane and are rotated around Z axis to achieve the full 360-degree FOV for each of the multiple lasers. Under this design, it can be difficult to align these lasers precisely and maintain the laser alignment, especially when considering each laser beam should be well collimated with a beam diameter large enough for distance sensing over a sufficient range (e.g., 120 meters). The relative orientation error of the lasers may cause large ranging errors. Each laser can be driven with short electrical pulses (e.g., 5 nanoseconds) of a high electrical current from a high-power driving circuit which can be costly and bulky. In addition, the optics for sending and receiving the different laser beams in such a LiDAR can be bulky and heavy, thus rendering the LiDAR bulky and heavy. Furthermore, all the lasers and associated receiving optics should be placed on the rotation stage to achieve the full 360-degree FOV. This requirement can further increase complexity of the optic head of the LiDAR and render the LiDAR bulky, heavy, and prone to mechanical failures.

In light of the above technical limitations in some LiDAR designs and based on recognition of various practical needs for high-performance, reliable, light-weight and cost-effective LiDAR sensors for commercial and other applications, this patent document provides designs of LiDAR systems that produce different probe laser beams at different laser wavelengths based on wavelength division multiplexing (WDM) to achieve simplified optical designs, reliable optical alignment, simplified electronic circuitry, and improved scanning of the different probe laser beams. Implementations of the disclosed designs can be used to construct LiDAR systems using low cost and widely available components developed for fiber optic communication industry and to efficiently obtain a large vertical FOV in LiDAR sensing operations. Various examples of WDM LiDAR designs are disclosed.

Certain implementations of the disclosed WDM LiDAR designs or features may achieve one or more of the following advantages. For example, a WDM LiDAR based on the disclosed technology can place all lasers, detection optics and electronics to be remotely located from the rotating optical head (e.g., they are in the trunk of a car while the optical head is placed on an exterior of the car such as the car roof top) and this arrangement can be used to make the optical head simple, compact and light. For example, in some implementations, unlike the LiDAR example in FIG.

1 in which every laser has a driving circuit for generating required short pulses with high electrical current, a WDM LiDAR based on the disclosed technology can have all lasers share a single driving circuit for generating needed short pulses with a high electrical current, reducing the complicity, cost, and power consumption. For another example, unlike the LiDAR example in FIG. 1 which has separate light emitting and receiving lens systems, a WDM LiDAR based on the disclosed technology can be implemented to share the light emitting and receiving optics for the different lasers and this sharing can further reduce the size, weight and cost of the resulting LiDAR system.

Figure 2A:
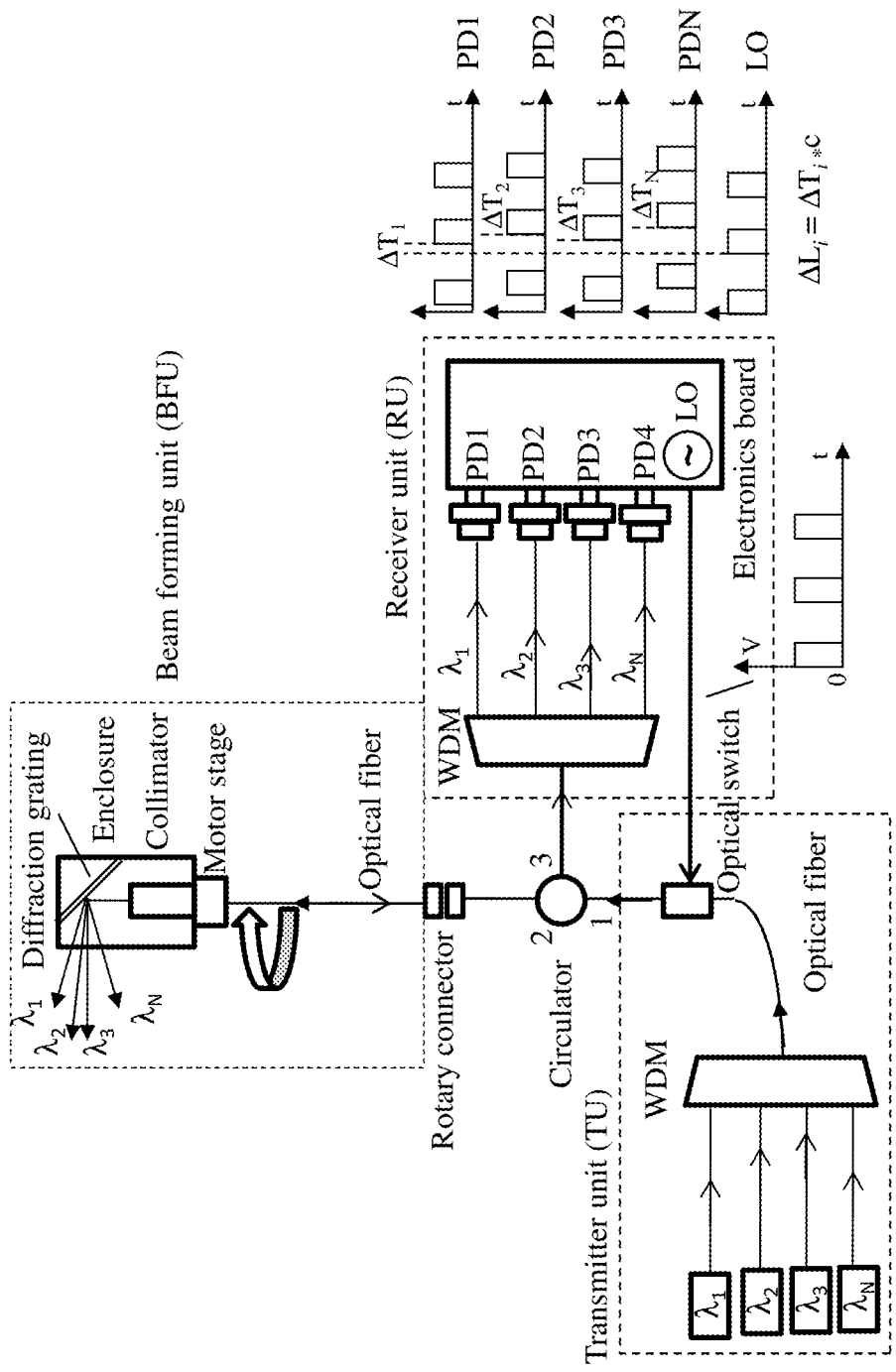
FIG. 2A shows an example of a first embodiment of the WDM based multi-channel rotating WDM LiDAR system.

FIG. 2A shows an example of a first embodiment of the WDM based multi-channel rotating LiDAR system. This LiDAR system example includes 3 main functional units: (1) a transmitter unit (TU) for generating different probe laser beams at different laser wavelengths, (2) a beam forming unit (BFU) as an optical head for using the generated probe laser beams to form output probe laser beams at different directions, for sending out the probe laser beams and for receiving the returned probe light, and (3) a receiver unit (RU) for receiving the returned probe light from the BFU and detecting different returned probe light at different wavelengths, respectively, as indicated in the dotted boxes. Multiple lasers with different wavelengths on telecom ITU grid in the transmitter unit TU may be used to generate the probe laser beams which are combined by a WDM module into a fiber. The WDM module can be implemented in various configurations, including, e.g., an arrayed waveguide grating (AWG), a thin film coating based WDM module, or other suitable WDM technologies. The fiber directs the combined optical output to an optical switch or a semiconductor optical amplifier (SOA) which can be turned on and off rapidly by electrical pulses from a local oscillator (LO) circuitry. Using an SOA as the optical switch has the advantage of having both optical amplification and switching functions in one structure or device. An additional high power optical amplifier, such as an erbium doped fiber amplifier (EDFA) or a SOA, can be used to further boost the power in all wavelength channels. The combined optical output carried by the fiber, after passing through the optical switch, is next directed to an optical circulator that is coupled to the beam forming unit (BFU) so the combined optical output is received by the BFU and is further processed for output. The optical circulator is also coupled to the receiver unit (RU) so that the returned probe light from the surroundings received by the BFU can be directed to the receiver unit RU for detection.

The specific BFU example shown in FIG. 2A includes a wavelength-selective optical device that separates the received probe light from the fiber with different WDM wavelengths into different output probe beams at the different WDM wavelengths, respectively. For example, a diffraction grating may be one implementation of this wavelength-selective optical device for diffracting the probe light at the different WDM wavelengths into different output probe beams at different directions at the different WDM wavelengths, respectively. An optical collimator may be provided to collimate the combined optical output containing light at different WDM wavelengths from the fiber when incident on the diffraction grating which diffracts the incident light containing optical pulses at different WDM wavelengths into different directions to cover different vertical angles for sensing the surroundings. In the illustrated example in FIG. 2A, a motor fixture or motor is engaged to the BFU to rotate the optical collimator and the grating assembly horizontally around a vertical axis to cover a desired FOV so that all the beams of different WDM wavelengths at different vertical angles are scanned or rotated horizontally to sense different parts of the surroundings.

The BFU in the example in FIG. 2A is also a rotating optical receiver to receive the returned probe light at the different WDM wavelengths from the surroundings. In operation, the returned probe light at the different WDM wavelengths is received by the wavelength-selective optical device (e.g., a diffraction grating) and the retro-reflected probe light at the different WDM wavelengths would be recombined into a single combined return probe beam having light in the different WDM wavelengths and the single combined return probe beam is directed into the optical collimator and is coupled into the fiber to the optical circulator. The optical circulator redirects the single combined return probe beam to the RU. The RU includes a WDM demultiplexer which separates light in the single combined return probe beam at the different WDM wavelengths into different and separated return probe beams at the different WDM wavelengths along separate optical paths. Under this design, non-retro-reflected probe light at a particular WDM wavelength does not retrace the same light path as the retro-reflected light and thus does not return to the optical fiber. Accordingly, the optical design of the BFU can automatically reject non-retro-reflected probe light from being routed back to the optical fiber. Different optical detectors, such as photodiodes PDs, are placed in the different optical paths to receive the separated return probe beams at the different WDM wavelengths, respectively. In addition, the WDM demultiplexer operates an optical filter and a spatial filter to prevent light at a WDM wavelength from getting into an optical detector designed to detect light at light at another WDM wavelength. An electronic board with detector circuitry is coupled to receive the detector output signals from the optical detectors, respectively, and processes the detector output signals to generate the analog LiDAR signals for further processing. The local oscillator (LO) circuitry for controlling and operating the optical switch or SOA may also be included in the electronic board. A timing chart of the LO signal is provided below the RU in FIG. 2A. As shown by the example timing charts of the detector output signals on the right-hand side of the RU in FIG. 2A, the pulses in the detector output signals reflect different time delays with respect to the pulses in the LO signal and contain position information of detected objects encountered by the scanning output probe beams at the different WDM wavelengths.

Figure 2B:
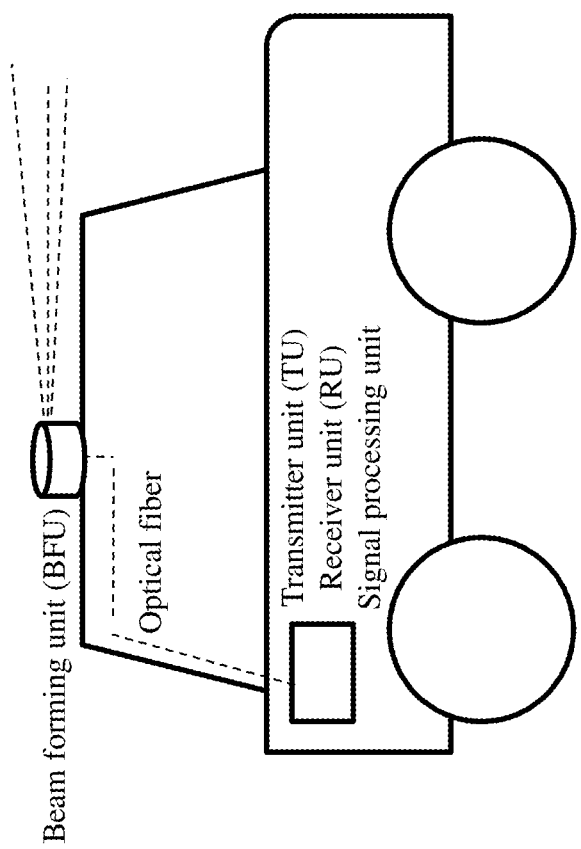
FIG. 2B shows an example for the placement of the WDM based multi-channel rotating LiDAR system. The BFU can be put on the top of the car and the transmitter, receiver, and signal processing units can be placed in the trunk or base of the car.

FIG. 2B shows an example of placement of the BFU of the LiDAR on the top of a vehicle while TU, RU and a signal processing unit are physically separated from the BFU and placed in selected parts of the vehicle (e.g., hidden in an interior of the car). The TU and RU are optically linked to the BFR via optical fiber. The rotation of the BFU causes the scanning of the different probe laser beams (at different WDM wavelengths) at different vertical angles. The transmitter and receiver units TU and RU have the flexibility of being located remotely from the BF unit with the rotating optical head, connected by a single optical fiber. For example, the transmitter and receiving units TU and RU can be placed in the trunk of a car, and the BF unit can be mounted on the top of the car, which makes the BF unit simple, compact, and light. In other implementations, all three different units can be located in three different locations in the body of a car, depending on the convenience and the needs of a particular application.

In the example in FIG. 2A, the rotating BF unit and the circulator can be connected with a fiber optic rotary connector, which allows the BF unit to be rotated rapidly while keeping the rest of the system, including TU and RU, stationary. The reflected beams of different directions (at different WDM wavelengths) are coupled back into the fiber and are directed by the circulator into the receiving unit (BU). The receiving unit BU includes a WDM demultiplexer that separates light at different WDM wavelengths into different light beams along different optical paths leading different photodetectors (which can be PIN diode, APD, photomultiplier, or other types of detectors). The photodetectors convert the received light into electrical pulses corresponding to the light pulses in the received light and the timings of such detected pulses are then compared with the pulses from LO. The time difference is directly proportional to the distance of the obstacles detected by pulses of different WDM wavelengths.

Under this design, returned light at different WDM wavelengths correspond to different beam vertical angles, respectively, for probing different regions in the surroundings and therefore a three dimensional point cloud map can be generated using the information of the beam vertical angle (wavelength or photodetector number), the horizontal rotation angle (motor rotation angle), and the distance (timing difference). Using the existing or other WDM technologies developed for telecommunications industry, a large number of WDM wavelengths is available to cover the vertical field of view (FOV) requirement for autonomous vehicle applications (e.g., more than 80 wavelength channels in the C-band).

In the example in FIG. 2A, only a single optical switch is used to generate optical pulses for lights from all lasers. In addition, a single optical amplifier can be used to amplify light beams from all lasers. An SOA can be used as both the optical switch and amplifier to further reduce the cost. This sharing of components by different WDM channels can reduce the number of components and the cost of the overall LiDAR system.

In the example in FIG. 2A, only a single optical fiber is used to deliver light at the different WDM wavelengths from all lasers in the transmitter unit TU to the fiber collimator in the beam forming unit BFU. The returned light of the different WDM wavelengths from targets is coupled back to the same collimator and the same fiber, and is directed by the optical circulator into the receiver unit. Therefore, under this design, the same optics is used for both the light emission and optical reception. This sharing of optics reduces or minimizes the number of the optical parts and reduces the cost and size.

Figure 3:
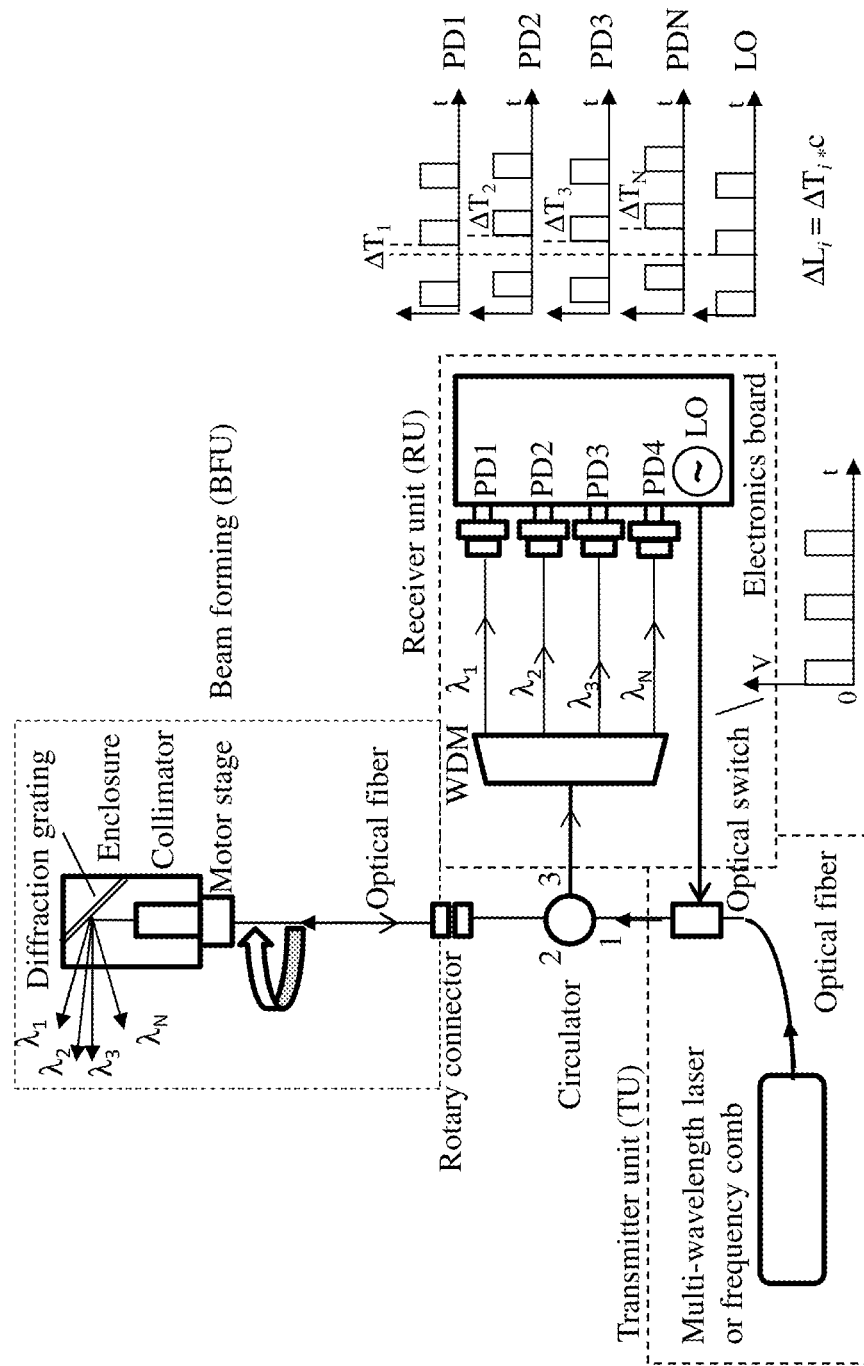
FIG. 3 shows an example of a second embodiment of the WDM based multi-channel rotating LiDAR system. A multi-wavelength laser or a frequency comb, such as a mode-locked laser is used to replace the multiple lasers used in FIG. 2.

FIG. 3 shows an example of a second embodiment of the WDM based multi-channel LiDAR system based on the disclosed technology. Like the example in FIGS. 2A and 2B, a motor is used to rotate the BFU. A multi-wavelength laser or a frequency comb, such as a mode-locked laser is used to replace the multiple lasers used in FIG. 2A to generate laser light at the different WDM wavelengths. The optical switch coupled between the laser source and the optical circulator is clocked by the LO clock signal. In some implementations, a mode-locked laser is used to generate laser pulses with the frequency comb at the different WDM wavelengths and, if the repetition rate of the mode-locked laser is sufficiently low, the optical switch can be eliminated and the LO clock can be used to control the optical modulator in the mode-locked laser. For the case of using a mode-locked laser with relatively low repetition rate, the LO can be used to drive the modulator inside the mode-locked laser.

Figure 4:
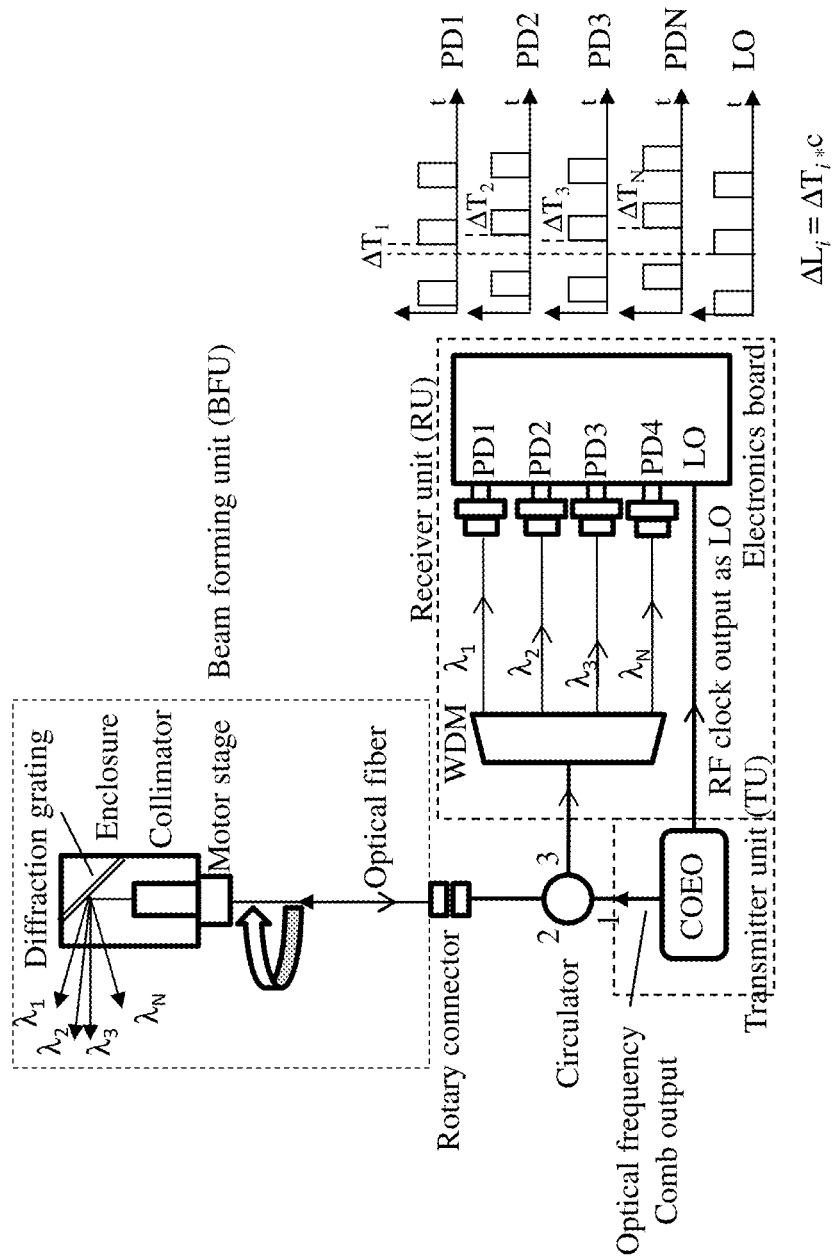
FIG. 4 shows an example of a third embodiment of the WDM based multi-channel rotating LiDAR system. This example also show a use of acoupled opto-electronic oscillator (COEO) to generate the frequency comb and an example of using the RF output of the COEO as the clock of the local oscillator for timing.

FIG. 4 shows an example of a third embodiment of the WDM based multi-channel LiDAR system based on the disclosed technology. A coupled opto-electronic oscillator (COEO) is used to generate the probe laser light at the different WDM wavelengths in a frequency comb. The COEO also functions as an optical switch that is in the designs in FIGS. 2A and 3. In addition, the RF output of the COEO is used as the clock of the local oscillator for providing the timing reference in detecting the delays in the returned optical pulses in the returned probe light at the different WDM wavelengths. Like the example in FIGS. 2A and 2B, a motor is used to rotate the BFU. More details on COEO devices are provided in later sections of this document.

Figure 5:
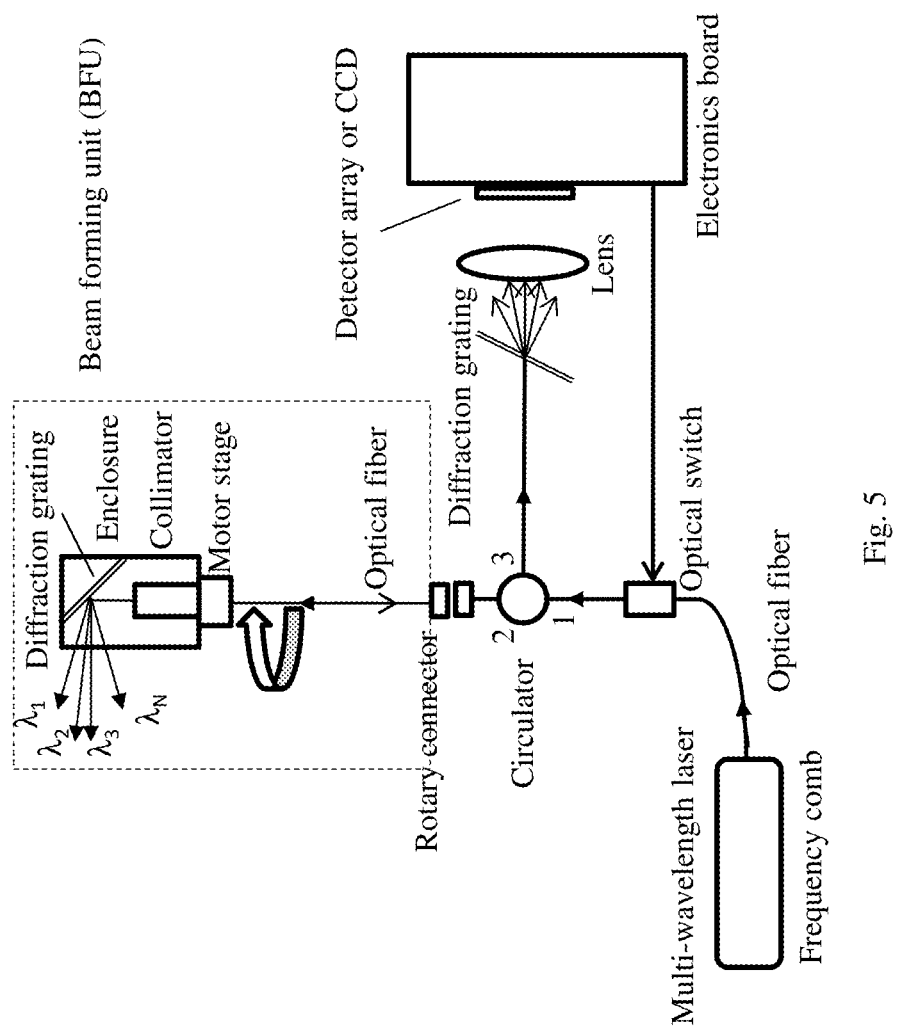
FIG. 5 shows an example of a fourth embodiment of the WDM based multi-channel rotating WDM LiDAR system.

FIG. 5 shows an example of a fourth embodiment of the WDM based multi-channel LiDAR system. One or more lasers can be used to generate the probe laser light at the different WDM wavelengths as disclosed above. In this example, a diffraction grating system is used to de-multiplex the returned signals at the different WDM wavelengths into different returned beams at the different WDM wavelengths, respectively, for optical detection. In this specific example as illustrated, a lens is used to receive the different returned beams at the different WDM wavelengths from the diffraction grating and to direct the beams to a detector array such as a CMOS sensor array or a CCD sensor array. Like the example in FIGS. 2A and 2B, a motor is used to rotate the BFU.

Figure 6:
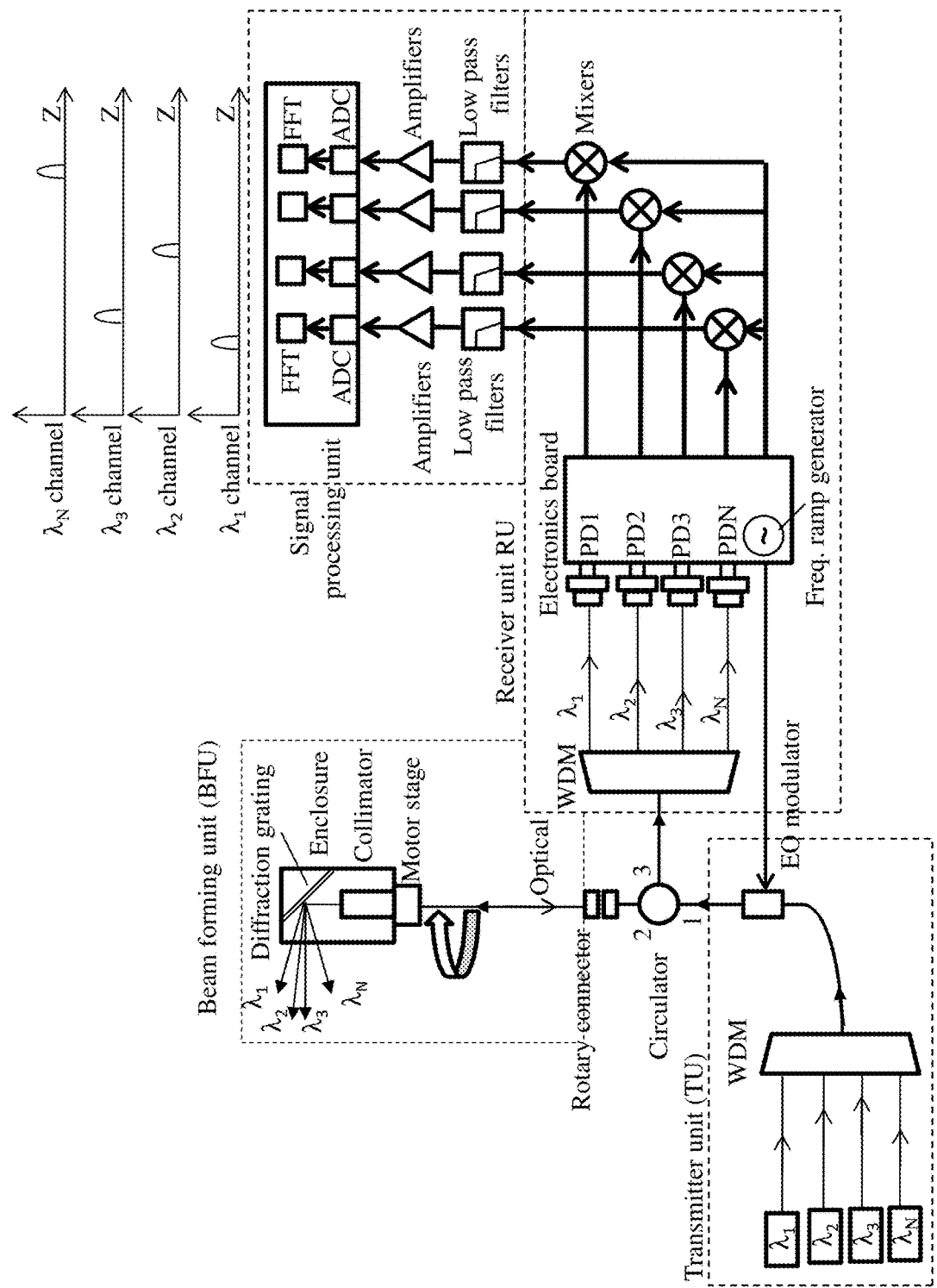
FIG. 6 shows an example of a fifth embodiment of the WDM based multi-channel rotating WDM LiDAR system.

FIG. 6 shows an example of a fifth embodiment of the WDM based multi-channel LiDAR system using a frequency modulated continuous wave (FMCW) scheme to obtain distance information of optical reflections. Different continuous wave (CW) lasers are used in this example to generate different laser beams at different WDM wavelengths. A frequency ramp generator, which may be included in the electronics board, is used to generate a frequency ramp signal applied to drive an electro-optic modulator (EO modulator) for modulating the laser beams at the different WDM wavelengths simultaneously with a modulation frequency chirp. The beams in the fiber are then coupled into the BF unit via a rotary connector. The modulated beams are directed into the BFU and, after reaching the diffraction grating, the laser beams of the different WDM wavelengths are diffracted into different directions vertically as separate outgoing probe laser beams for sensing the surroundings. The returned beams at the different WDM wavelengths from targets in the surroundings are received by the BFU and are coupled back to the fiber and directed to the WDM demultiplexer in the receiving unit RU to be de-multiplexed into different returned beams at the different WDM wavelengths to be respectively received and detected by different photodetectors. The detected signals are then amplified and filtered before mixing with the frequency ramp signal from the frequency ramp generator. The outputs from the mixers are then filtered by the low-pass filters before converting into digital signals by analog to digital converters (ADCs). In the digital processing, the detector signals are processed via Fast Fourier Transform (FFT) to obtain the reflection vs. distance information in the signal processing unit. Like the example in FIGS. 2A and 2B, a motor is used to rotate the BFU. The above signal process can be applied to other embodiments of WDM based multi-channel LiDAR systems.

Figure 7:
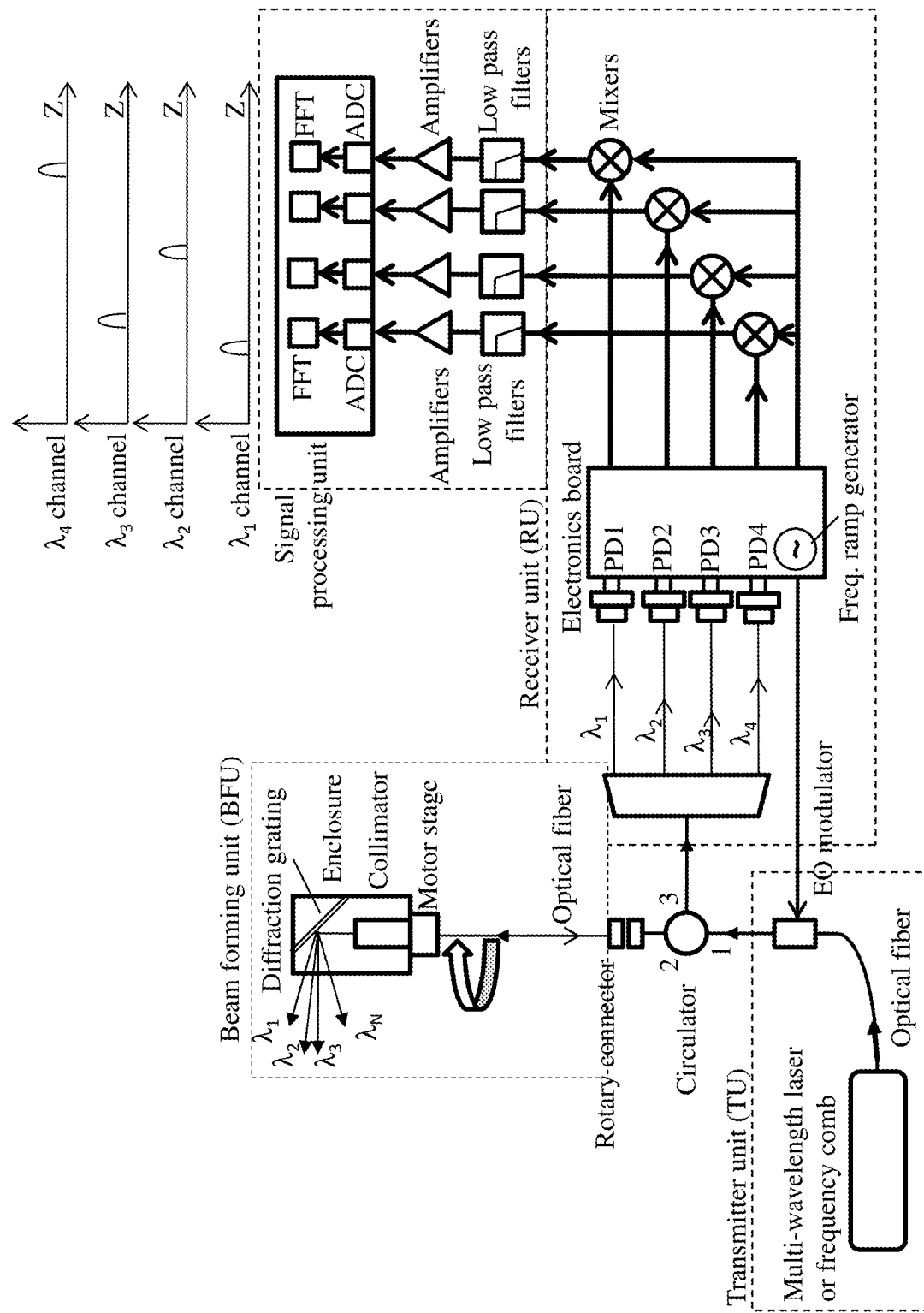
FIG. 7 shows an example of a sixth embodiment of the WDM based multi-channel rotating WDM LiDAR system.

FIG. 7 shows an example of a sixth embodiment of the WDM based multi-channel LiDAR system based on various features in the example in FIG. 6, except that the multiple CW lasers with different wavelengths in the transmitter unit in FIG. 6 are replaced with a multi-wavelength laser or a frequency comb. Like the example in FIGS. 2A and 2B, a motor is used to rotate the BFU.

Figure 8:
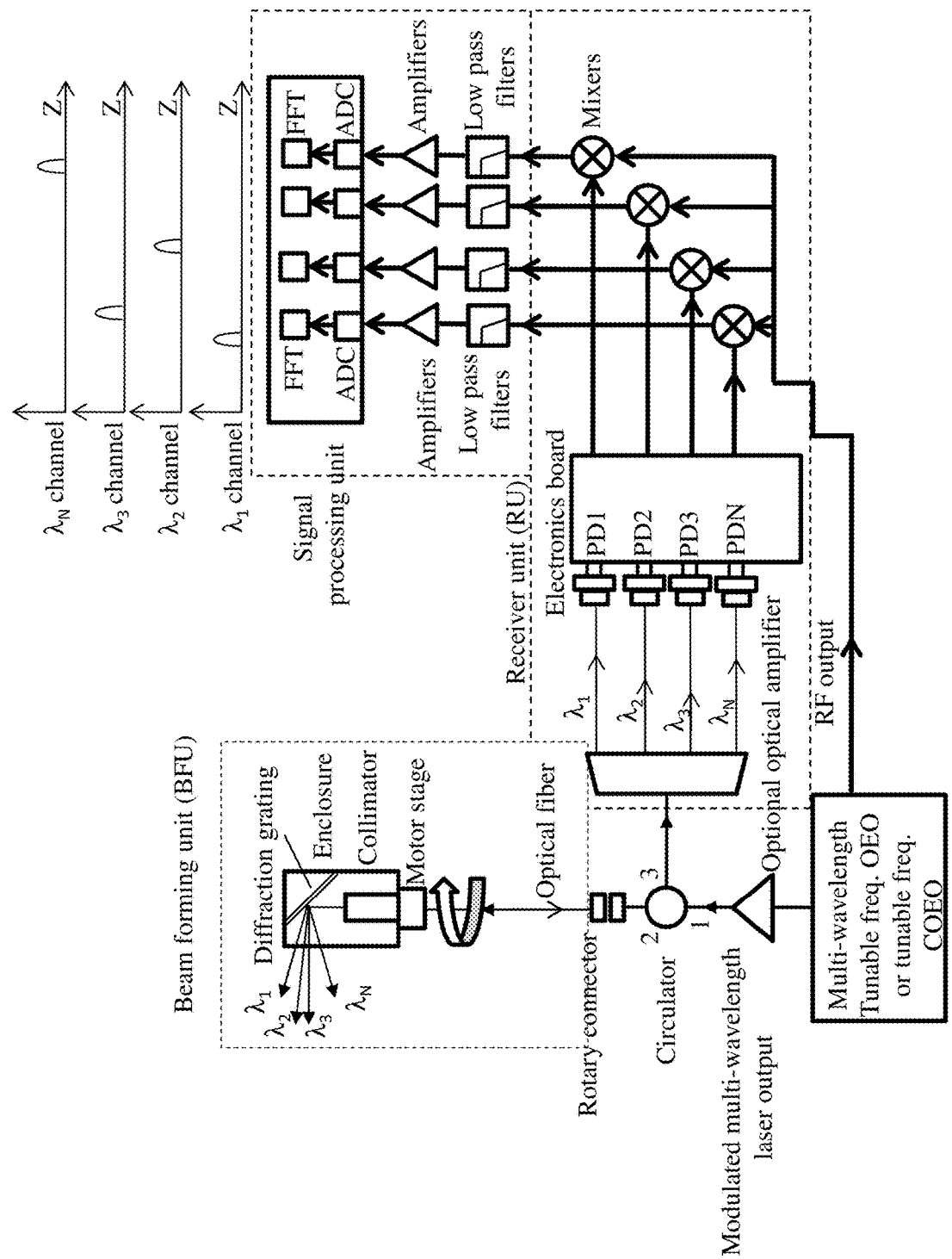
FIG. 8 shows an example of a seventh embodiment of the WDM based multi-channel rotating WDM LiDAR system.

FIG. 8 shows an example of a 7th embodiment of the WDM based multi-channel rotating LiDAR system based on various features in the example in FIG. 6 except that here the multiple CW lasers with different wavelengths in the transmitter unit are replaced with a multi-wavelength tunable frequency Opto-electronic Oscillator (OEO) or a tunable frequency COEO to generate the probe laser light at different WDM wavelengths. The RF output from the OEO or COEO is used as a LO signal to be mixed with the received signals of different wavelengths from the receiver unit. Like the example in FIGS. 2A and 2B, a motor is used to rotate the BFU. More details on multi-wavelength tunable frequency OEO devices are provided in later sections of this document.

Figure 9A:
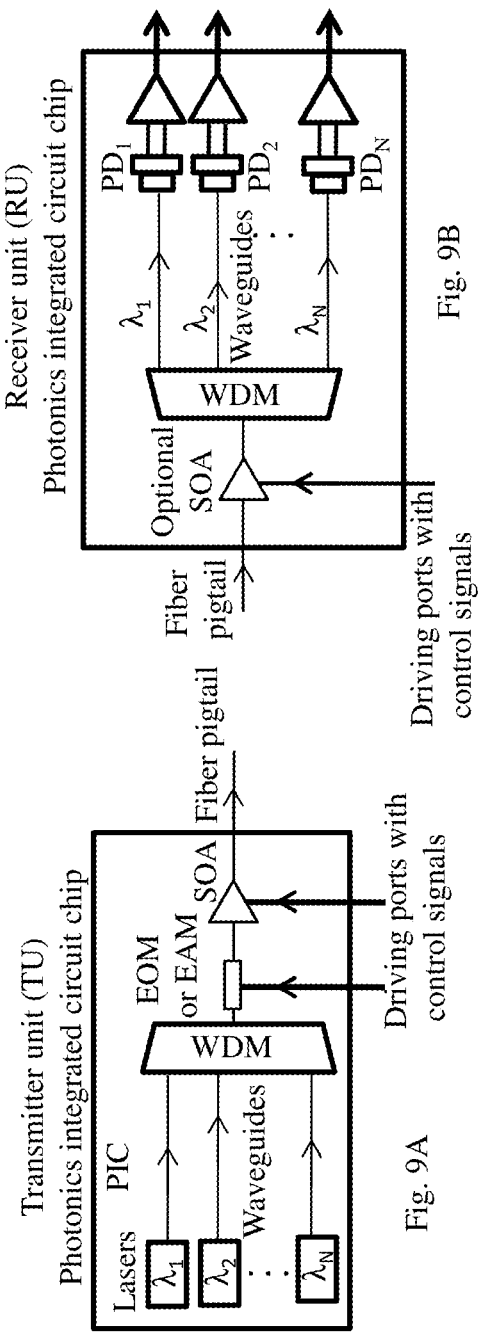
FIG. 9A shows an example of a multi-wavelength transmitter integrated in a photonics integrated circuit (PIC) for using in FIG. 2 and FIG. 6.

FIG. 9A shows an example for implementing a multi-wavelength transmitter integrated in a photonics integrated circuit (PIC) for implementing the WDM based multi-channel rotating LiDAR systems in FIG. 2A and FIG. 6. Different lasers are provided to generate the laser beams at different WDM wavelengths and a WDM multiplexer is provided to combine the different laser beams into a combined laser beam. In some implementations, for example, the wavelength division multiplexer can be made with AWG technology or other integrated optic technologies. Downstream from the WDM multiplexer, an optical modulator, e.g., an electro-optic modulator (EOM) or an electro-absorption modulator (EAM) can be used as an optical switch turn on and off the laser light in response to drive to a LO signal or other reference signal. An optical amplifier, such as an SOA, may also be used as an optical switch in addition to providing a function of an amplifier. Other type optical amplifiers, such a doped waveguide optical amplifier, can be used to simply boost the power of the light in all the WDM wavelengths. The output of this TU is coupled to a fiber pigtail for delivery by a fiber coupled to the BFU and the RU in FIGS. 2 and 6.

Figure 9B:
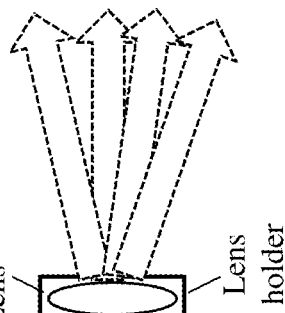
FIG. 9B Illustration of a multi-wavelength receiver integrated in a photonics integrated circuit (PIC) for using in FIGS. 2, 3, 4, 6, 7, 8.

FIG. 9B shows an example for implementing a multi-wavelength receiver integrated in a photonics integrated circuit (PIC) for using in FIGS. 2, 3, 4, 6, 7, and 8. A wavelength division demultiplexer is provided to split the received light into different optical signals at the different WDM wavelengths and this WDM can be made with AWG technology or other integrated optic technologies in implementations. At the input of this RU, an SOA can be used as a gated optical amplifier to improve signal to noise ratio because it has both the switching and amplification functions.

Figure 9C:
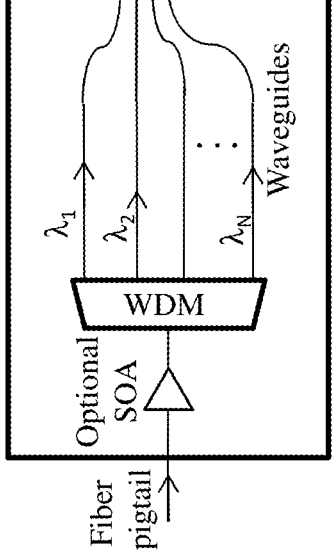
FIG. 9C shows an example of a first embodiment of the beam forming unit integrated on a PIC chip.

FIG. 9C shows an example for implementing a first embodiment of a beam forming and rotation (BF) unit integrated on a PIC chip. Different other BFU designs using a diffraction grating, a lens array of lenses is used in FIG. 9C to direct light of different WDM wavelengths into different vertical directions by optical alignment offsets for the different WDM channels. Specifically, the vertical direction $\alpha$ of each beam at a particular WDM wavelength can be set by controlling the offset distance d of each beam (e.g., or a waveguide for carrying each beam) to the center line of an optical axis of its corresponding lens by $\alpha=\tan^{-1}(d/f)$, where f is the focal length of the lens. In some implementations, the chip with the BF unit may be mounted on a motor stage to rotate continuously to cover 360 degree azimuth angles or to scan back and forth over a certain angle.

Figure 9D:
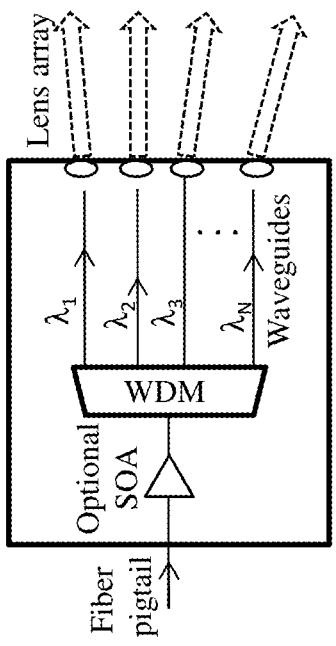
FIG. 9D shows an example of a second embodiment of the beam forming unit integrated on a PIC chip.

FIG. 9D shows an example for implementing a second embodiment of a BF unit integrated on a PIC chip. A single lens is used to direct light from different waveguides into different vertical directions. The ith beam's vertical direction $\alpha_i$ can be determined by the distance $d_i$ of the ith waveguide to the center line of the lens by $\alpha_i=\tan^{-1}(d_i/f)$, where f is the focal length of the lens. The chip is mounted on a motor stage to rotate continuously to cover 360 degree azimuth angles or to scan back and forth over a certain angle.

In implementations, the transmitter PIC chip, the receiver PIC chip, and the BF PIC chip can be all packaged together or even integrated on a same larger PIC chip.

The example in FIGS. 2A and 2B and other examples above use a motor to rotate the BFU around a vertical rotation axis to horizontally scan a set of different probe laser beams at different vertical angles (at different WDM wavelengths) to form a cone of probe laser beams for 3-D scanning and sensing. In other examples disclosed in this document, WDM LiDARs may be used to eliminate such a motor or other moving parts associated with the beam scanning while enabling formation of a cone of beams, each with a different wavelength for 3-D sensing. In such a WDM 3D beam forming, the motor fixture and the rotary connectors can be eliminated to minimize mechanical failures resulting from the moving mechanical parts.

FIG. 10 shows one example implementation of a WDM based 3D beam forming without moving beams or moving parts. Fiber or waveguide tips corresponding to probe beams at the different WDM wavelengths are arranged in a 2D array. The array is placed on the focal plane of a collimating lens. The light beams from different fiber tips form a 3D cone of the light beams at the output of the collimating lens, with the direction angle $\alpha_{ij}$ of each beam determined by the distance $d_{ij}$ of the corresponding fiber tip to the center line of the lens by $\alpha_{ij}=\tan^{-1}d_{ij}/f$, where f is the focal length of the lens. Multiple such beam cones can be put together to cover a bigger space or arranged in a circle to 360 degrees with a vertical FOV. The BF unit of FIG. 10 can be used to replace the BF units in FIGS. 2-8 so that the motor fixtures and the rotary connectors can be eliminated.

Figure 11A:
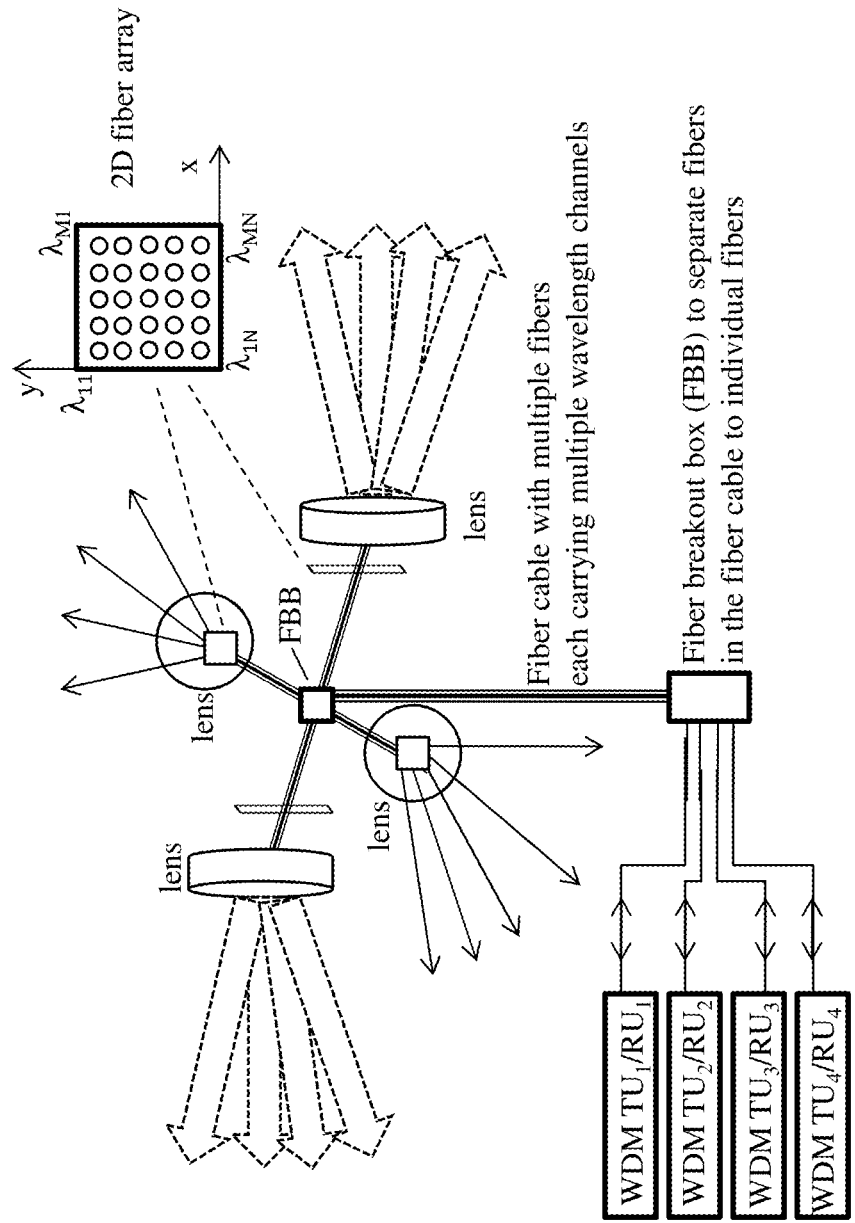
FIG. 11A shows an example f using multiple WDM 3D beam forming units with multiple beams cones to cover wide azimuth and vertical FOV's without beam scanning. The fiber cable with multiple fibers each carrying multiple wavelength channels to feed signal to a WDM 3D beam forming unit. The multiple WDM 3D beam forming units are arranged to cover the targeted spaces of interest. As illustrated, four sets of WDM TU, RU and BFU's are used, each set can use the same wavelength channels or different wavelength channels.

FIG. 11A shows an example of a WDM based multi-channel LiDAR system using multiple WDM 3D beam forming units with multiple beams cones shown in FIG. 10 to cover wide azimuth and vertical FOV's without using moving parts and beam scanning. A fiber cable or bundle having multiple fibers are provided to carry light of the different WDM wavelengths, respectively, and each fiber carries light of one of the multiple WDM wavelength channels to feed the optical signals at the different WDM wavelengths to a WDM 3D beam forming unit having multiple WDM 3D beam forming units. The multiple WDM 3D beam forming units are arranged to cover the targeted spaces of interest. As illustrated, four sets of WDM TU, RU and BFU's are used, each set can use the same wavelength channels or different wavelength channels.

Figure 11B:
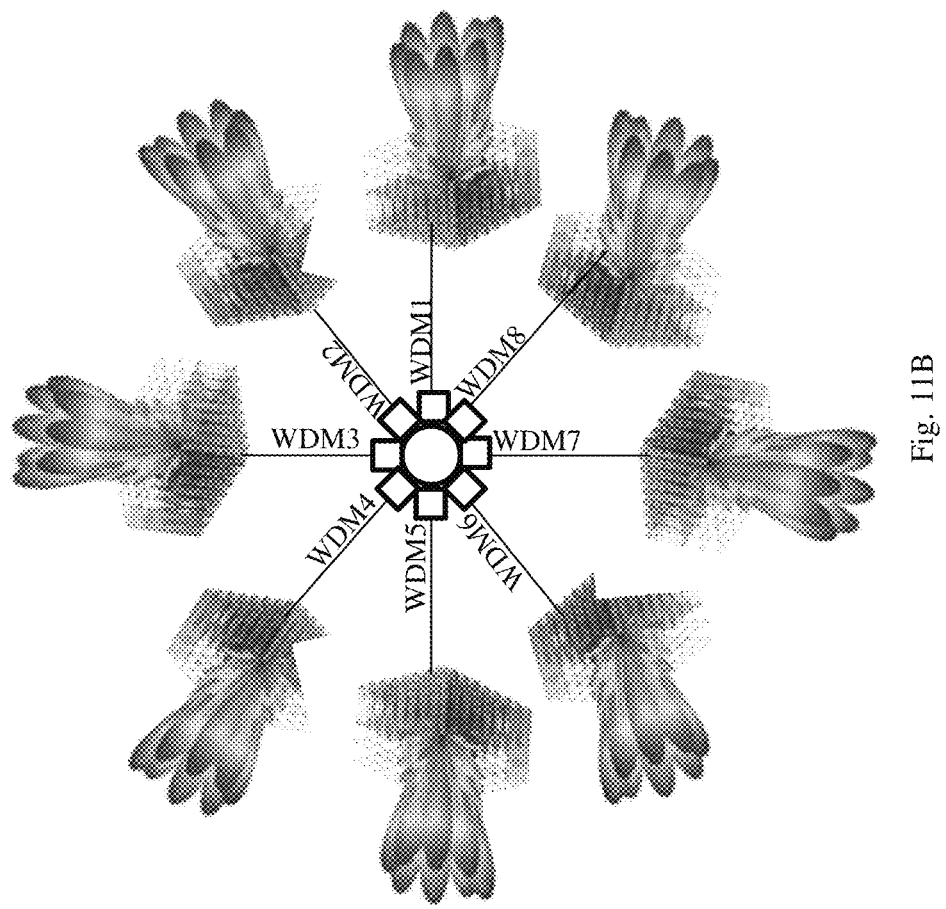
FIG. 11B shows an example of using multiple WDM 3D beam forming units with multiple beams cones to cover wide azimuth FOV and vertical FOV without beaming scanning. Here 8 WDM 3D beam forming units are arranged in a circle to cover 360 azimuth FOV without beam scanning, each WDM 3D beam forming unit can also cover required vertical FOV. There are also 8 sets of WDM TX and RX units, each is connected with a corresponding WDM BF unit.

FIG. 11B further illustrates an example of a WDM 3D beam forming unit having multiple WDM 3D beam forming units to produce multiple beams cones to cover wide azimuth FOV and vertical FOV without beaming scanning. This particular example uses 8 WDM 3D beam forming units that arranged in a circle to cover 360 azimuths FOV without beam scanning; each WDM 3D beam forming unit can also cover a desired vertical FOV. Similar to the arrangement in FIG. 11A, the same number of sets of WDM TU and RU units are provided, each connected with a corresponding WDM BFU.

The beam forming unit example shown in FIG. 9C may also be configured as a 3D beam forming unit to perform the similar 3D beam output as the example in FIG. 10 for implementing the WDM based multi-channel LiDAR system using multiple WDM 3D beam forming units shown in FIGS. 11A and 11B. The lens array shown in FIG. 9C can be arranged as a 1-dimensional array or a 2-dimensional array of lenses. To produce the similar 3D beam output as the example in FIG. 10, the lens array in FIG. 9C can be configured as a 2D lens array and the optical output terminals of the optical waveguides or fibers from the WDM demultiplexer can be respectively coupled the lenses in the 2D lens array to output a cone of output beams at different WDM wavelengths at different output beam directions.

Referring back to the example in FIG. 8, an Opto-electronic Oscillator (OEO) can be used to generate the probe laser light at different WDM wavelengths. Various implementations of such an OEO can include an electrically controllable optical modulator that receives input light such as laser light to produce a modulated optical output, an opto-electronic feedback loop that comprises an optical part and an electrical part interconnected by a photodetector to receive the modulated optical output from the optical modulator and to convert the modulated optical output into an electrical signal to control the optical modulator so that the modulated optical output is modulated to carry an electrical RF or microwave oscillation signal at a radio frequency or microwave frequency. The opto-electronic feedback loop is structured to feed the electrical signal in phase to the optical modulator to generate and sustain both optical modulation and electrical oscillation at the radio frequency or microwave frequency. OEOs are known for their unique properties or characteristics, including low phase noise, spectral purity or narrow spectral width, immunity to EM interference, sharp falloff in the frequency domain, availability of optical processing and optical transmission, among others.

A variety of OEO configurations have been developed. U.S. Pat. Nos. 5,723,856 and 5,777,778 provide examples of single-loop OEOs and multi-loop OEOs. Another type of OEOs is coupled opto-electronic oscillators ("COEOs") described in U.S. Pat. No. 5,929,430 where a COEO directly couples a laser oscillation in an optical feedback loop to an electrical oscillation in an opto-electronic feedback loop. OEOs may be constructed by including optical resonators in the OEO loops as disclosed in U.S. Pat. No. 6,567,436 in which various forms of optical resonators may be used including optical whispering gallery mode resonators (e.g., U.S. Pat. Nos. 6,389,197 and 6,795,481) and other compact resonators such as integrated ring resonators for forming integrated opto-electronic oscillators having optical resonators (e.g., U.S. Pat. No. 6,873,631). OEOs can also be implemented by having at least one active opto-electronic feedback loop that generates an electrical modulation signal based on the stimulated Brillouin scattering where a Brillouin optical medium is included in the feedback loop to provide a natural narrow linewidth of the Brillouin scattering to select a single oscillating mode (e.g., U.S. Pat. Nos. 5,917,179, 6,417,957 and 6,476,959). OEOs can be used to suppress phase noise in RF or microwave oscillation signals (e.g., U.S. Pat. No. 6,580,532). Each of the above mentioned U.S. patents is incorporated by reference and is attached here as part of the disclosure of this patent document.

In many OEO implementations, the optical input to the optical modulator in the OEO may be laser light at one laser wavelength. A multi-wavelength tunable frequency OEO device for implementing the LiDAR designs in this document and in other applications beyond LiDAR may use an optical input that contains different laser beams at different WDM wavelengths.

Figure 12:
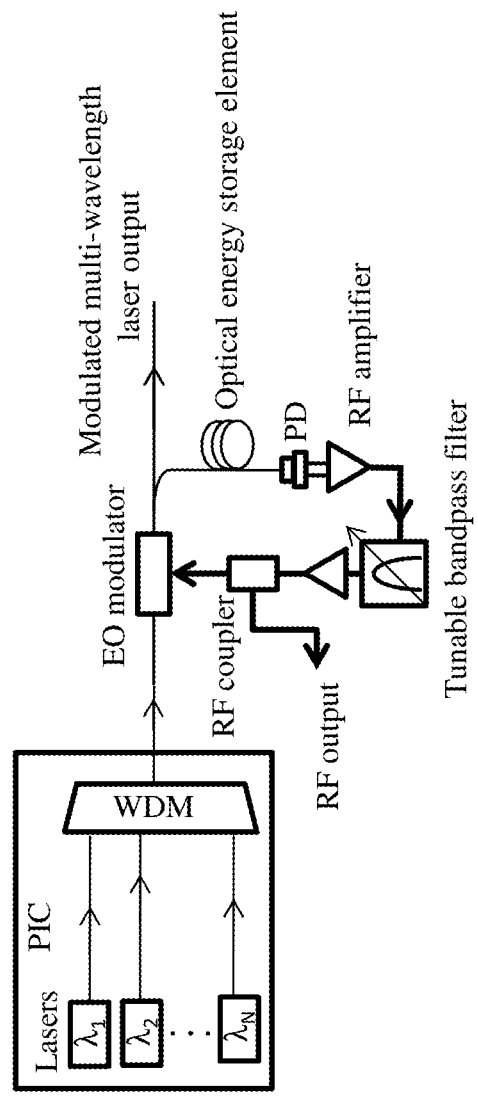
FIG. 12 shows an example of a first embodiment of a multi-wavelength tunable frequency OEO for using in FIG. 8.

FIG. 12 shows an example of a first embodiment of a multi-wavelength tunable frequency OEO for implementing the LiDAR system design in the example in FIG. 8 or in other LiDAR system designs disclosed in this patent document including, for example, the designs without moving parts in FIGS. 11A and 11B. In this example, a photonics integrated circuit (PIC) chip is provided to include different lasers at different WDM wavelengths (e.g., diode lasers or diode-laser-based lasers) and a WDM multiplexer to combine laser beams from the lasers at different WDM wavelengths into a combined beam as the optical input to the electro-optic (EO) modulator of the OEO device. In this example, the EO optical modulator is outside of the multi-laser PIC chip.

The OEO in FIG. 12 includes an opto-electronic loop formed by the EO optical modulator (or another suitable optical modulator such as an EAM) to modulate the optical input and to produce a modulated optical output, an optical delay line or an optical energy storage element (e.g., an optical resonator) coupled to receive at least a portion of the modulated optical output from the optical modulator, a photodetector as one optical-to-electrical conversion to receive the modulated optical output from the optical delay line or optical storage element, electronic circuitry coupled to the photodetector to process or condition the detector signal (e.g., a tunable RF bandpass filter, an RF amplifier and an RF coupler as shown) and to feed an electrical control signal to the optical modulator. With this opto-electronic loop, the modulated optical output produced by the optical modulator is modulated to carry an electrical RF or microwave oscillation signal at a radio frequency or microwave frequency. Here, the optical modulator is an electrical-to-optical conversion device for the OEO. The opto-electronic feedback loop is structured to feed the electrical signal in phase to the optical modulator to generate a signal gain in the loop to sustain both optical modulation and electrical oscillation at the radio frequency or microwave frequency.

In operation, the combined beam output by the WDM multiplexer having laser light at the different WDM wavelengths from the individual lasers shown in FIG. 12 is used as the optical input to the EO optical modulator and is modulated in response to the electrical control signal from the opto-electronic feedback loop. As a result of this OEO operation, the modulated optical output out of the EO optical modulator is a combined beam of different modulated optical signals at the different WDM wavelengths. At the output of the EO modulator or at another location in the optical part of the OEO loop, an optical coupler is provided to split the modulated optical output having modulated light at the different WDM wavelengths into two different optical beams: one being the output probe beam that is directed to the beamforming unit for optical sensing and another one being the optical feedback light into the optical portion of the OEO loop.

Figure 13:
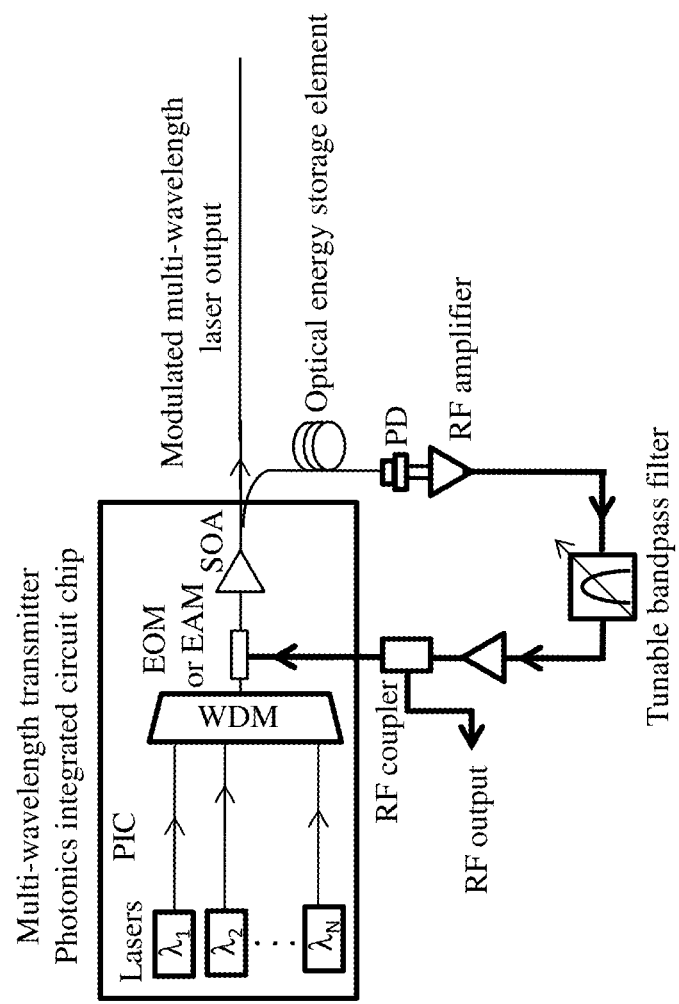
FIG. 13 shows an example of a second embodiment of a multi-wavelength tunable frequency OEO for using in FIG. 8.

FIG. 13 shows an example of a second embodiment of a multi-wavelength tunable frequency OEO for using in the LiDAR design in FIG. 8 or in other LiDAR system designs disclosed in this patent document including, for example, the designs without moving parts in FIGS. 11A and 11B. An electro-optic modulator (EOM) or electro-absorption modulator (EAM) is integrated on the multi-laser PIC chip with multiple lasers emitting laser light at different WDM wavelengths as the optical modulator for the OEO operation. In addition, an optional optical amplifier, such as a semiconductor optical amplifier (SOA), may be added to the PIC chip to amplify the modulated light output by the optical modulator.

Figure 14:
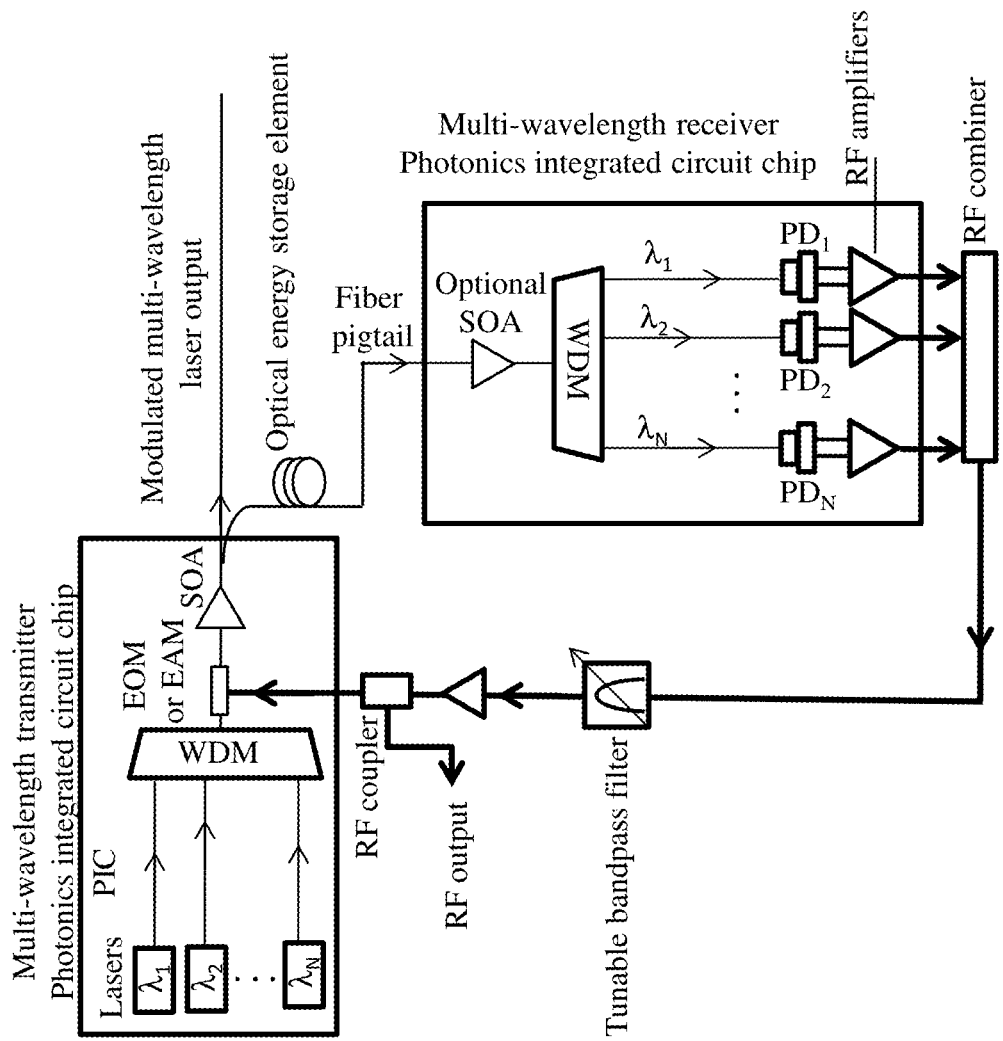
FIG. 14 shows an example of a third embodiment of a multi-wavelength tunable frequency OEO for using in FIG. 8.

FIG. 14 is an example of a third embodiment of a multi-wavelength tunable frequency OEO for using in the LiDAR design in FIG. 8 or in other LiDAR system designs disclosed in this patent document including, for example, the designs without moving parts in FIGS. 11A and 11B. In this example, the electro-optic modulator and an optional SOA are integrated on the multi-laser PIC chip. Instead of using a single optical detector to perform the optical to electrical conversion as in FIGS. 12 and 13 in the OEO loop, a multi-wavelength receiver PIC chip is used to provide different optical detectors that separately detect the returned signals of different WDM wavelengths. The detector outputs form the different optical detectors are combined by coupling a RF combiner to the outputs of the optical detectors. As shown, the multi-wavelength receiver PIC chip includes a WDM demultiplexer to separate the output light from the optical delay line or the optical energy storage element into different optical beams at different WDM wavelengths that are fed into the different optical detectors. An optional optical amplifier, such as an SOA, may be coupled before the WDM demultiplexer to amplify the light before the optical to electrical conversion at the different optical detectors. The combined RF signal from the RF combiner is directed into a tunable RF filter before being fed back to the EOM or EAM in the OEO. An RF amplifier may be optionally coupled in the electrical portion of the OEO loop.

Figure 15:
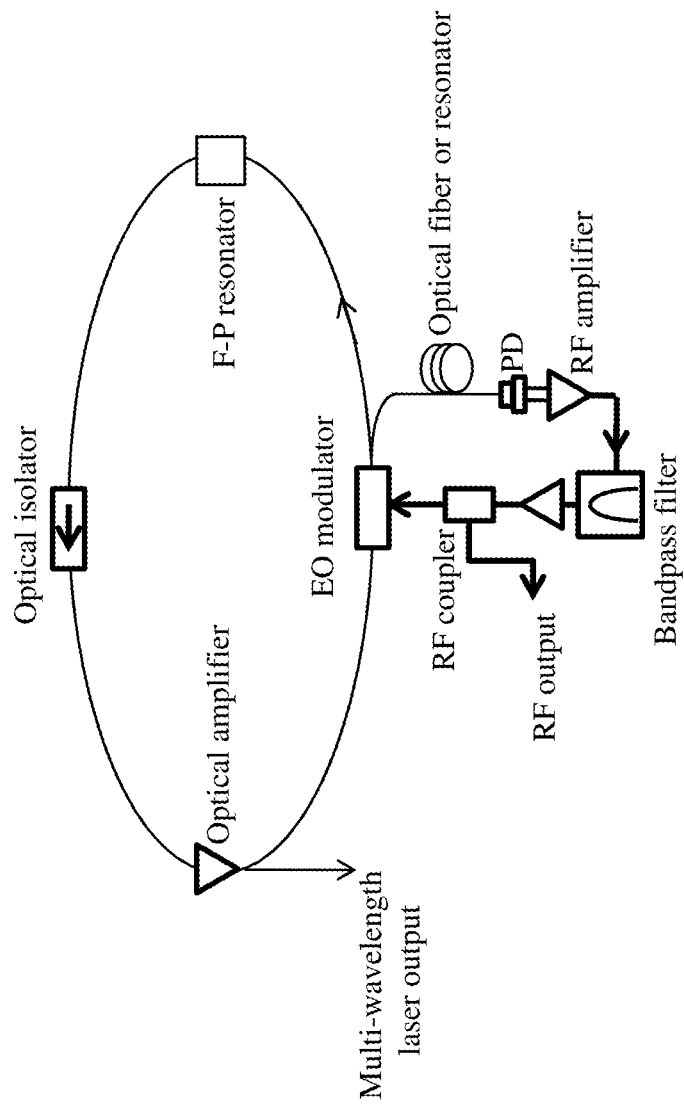
FIG. 15 shows an example of a first embodiment of a coupled electro-optic oscillator for using in FIG. 4. A tunable band-pass filter can be used to replace the fixed band-pass filter to make the COEO tunable to be used in FIG. 8.

FIG. 15 is an example of an embodiment of a coupled electro-optic oscillator (COEO) for using a LiDAR design with a COEO as light source and a rotating beam forming unit for scanning in FIG. 4 or a LiDAR design with a COEO as light source without moving parts as shown in the examples in FIGS. 11A and 11B. This OEO example and other OEO implementations are designed to directly couple a laser oscillation of an optical feedback system to an electrical oscillation of an opto-electronic feedback system. The laser oscillation and the electrical oscillation are coupled to each other and correlated with each other so that both the modes and stability of one oscillation are coupled with another oscillation. Therefore, a COEO includes two mutually coupled oscillation systems, a laser oscillator and an opto-electronic feedback oscillator. The laser oscillator includes an internal active optical feedback loop with a gain medium to effectuate a first loop gain greater than unity and is responsive to an electrical signal. The laser oscillator produces a coherent optical oscillation. The opto-electronic feedback oscillator is essentially an active opto-electronic feedback loop coupled to the laser oscillator and receives an optical signal from the output of the laser oscillator which is indicative of the optical oscillation. The opto-electronic feedback loop includes an optical delay element for producing a delay, a photodetector responsive to intensity variation of input optical signals for converting the optical signal from the optical delay element into an electrical modulation signal and an electrical interface with the laser oscillator to feed electrical modulation signal to the gain medium which modulates the optical gain in the optical feedback loop. The opto-electronic feedback loop is structured to have a second loop gain greater than unity to generate and sustain an electrical oscillation. The coupling of the two loops leads to a specific relation between (1) the loop length of the optical feedback loop in the laser oscillator and (2) the loop length of the opto-electronic feedback loop is necessary so as to make both optical and electrical oscillations stable. One of the advantages of COEOs is that the COEO can be self-oscillating without an external pump laser, although an external laser may be used in a COEO. Therefore, a coupled opto-electronic oscillator can be used to conveniently accomplish single-mode selection with ease even for a system having a very long opto-electronic feedback loop (OEO loop). In addition, a multimode laser can be used with an COEO to pump the electronic oscillation, and to achieve in an efficient operation and reduced manufacturing cost. An COEO can provide a link between the optical and the microwave or RF oscillations, which can be further used for simultaneously generating stable optical pulses and a continuous microwave oscillating signal (e.g., sinusoidal wave).

The COEO example in FIG. 15 includes a ring laser formed by an optical loop with one or more optical waveguides or fiber segments and this optical loop for the ring laser includes, an optical amplifier to produce the laser gain for the ring laser, and an optical modulator such as an EOM or EAM to modulate the laser light in the ring laser. In this specific example, an optical resonator such as a Fabry-Perot resonator is also included in the optical loop of the ring laser to produce an optical delay. An optical isolator may included in the optical loop of the ring laser to ensure the unidirectional light propagation in the ring laser. An optical coupler can be provided in the ring laser to couples a portion of laser light in the ring laser as an optical input labeled as "multi-wavelength laser output" for LiDAR sensing. Another optical coupler is provided at or near the optical modulator in the ring laser to generate an optical output to feed into the optical portion of the OEO loop. As shown in FIG. 15, the OEO loop includes an optical fiber or an optical resonator as part of its optical portion of the OEO loop, a photodetector linking the optical and electrical portions of the OEO loop, an RF amplifier, an RF or microwave bandpass filter and possibly additional elements (an RF coupler, additional RF amplifier etc.) to feed the RF or microwave oscillation signal as the control signal to the EOM or EAM. In this example, the EOM or EAM is the coupling point between the ring laser and the OEO. The ring laser and the OEO collectively form the COEO.

In some implementations, the phase delay of the opto-electronic feedback loop may be larger than the phase delay caused by the loop length of the ring laser, resulting in a corresponding mode spacing in the OEO loop smaller than the mode spacing of the ring laser. For example, the fiber in the optical loop may be a few meters while the fiber in the opto-electronic loop may be over 100 m or even many kilometers. The center frequency of the RF bandpass filter can be chosen to be substantially equal to an RF beat frequency of different optical modes of the ring laser. The bandwidth of the RF filter may is chosen to be narrower than the spacing of the beat frequencies which is equivalently the mode spacing of the ring laser. Within the passband of the RF filter, different OEO modes compete with one another in order to oscillate. However, the dominant mode has a frequency closest to a beat frequency of the ring laser's longitudinal modes so that only this OEO mode can obtain energy from the ring laser and then effectively mode locks the ring laser.

The above mode locking condition may be achieved by adjusting the relative phase delay between the optical loop of the ring and the opto-electronic loop. A correlation between the optical loop length and the loop length of the opto-electronic electronic loop is desirable in order to achieve stable oscillations in both loops and mode-lock the optical loop. The relative phase delay between the ring laser loop and the OEO loop can be adjusted with the RF variable delay in the OEO or other elements including a variable phase delay element in the optical loop such as a fiber stretcher. The relative phase delay between the two loops is so adjusted that one of the RF oscillation modes in the opto-electronic loop is close to or overlaps with a mode beat frequency of the optical loop. Once the ring laser is mode locked, the beating between any two neighboring modes adds in phase to provide a frequency equal to the frequency of the oscillation mode of OEO. This condition reinforces the OEO mode that locks the ring laser. The mode spacing of the mode-locked ring laser is equal to the oscillation frequency of the OEO in the opto-electronic loop and is a multiple of the natural mode spacing of the laser.

The COEO in FIG. 15 is an example of an opto-electronic device that includes a laser, including a laser active optical feedback loop with a first loop gain greater than unity and responsive to an electrical modulation signal to produce a coherent laser oscillation and an opto-electronic feedback loop with a second loop gain greater than unity, receiving an optical signal indicative of the laser oscillation and converting the optical signal into the electrical modulation signal having a relation with the laser oscillation so that the electrical modulation signal affects the laser oscillation in the laser active optical feedback loop.

In another aspect, the COEO in FIG. 15 is a specific implementation of an opto-electronic device that includes an active laser feedback loop with a first loop gain greater than unity and a first loop delay to generate a laser oscillation and having an electro-optical gain element that is operable to affect the first loop gain, and an opto-electronic feedback loop coupled with the active laser feedback loop, having a second loop gain greater than unity and a second loop delay greater than the first loop delay. This opto-electronic loop can include an optical delay line having one end coupled to the active laser feedback loop to receive an optical signal indicative of the laser oscillation and another end connected to a photodetector that converts said optical signal into an electrical modulation signal, an RF delay line having one end connected to the photodetector to receive the electrical modulation signal and another end connected to the electro-optical gain element, and an RF bandpass filter connected in the RF delay line, having a center frequency that is substantially equal to a RF beat frequency of different modes of the active laser feedback loop, whereby the active laser feedback loop is mode-locked to produce pulsed laser oscillations.

In some implementations, a tunable band-pass filter can be used to replace the fixed band-pass filter to make the COEO tunable to be used in the LiDAR design FIG. 8 or in other LiDAR designs in this document.

Figure 16:
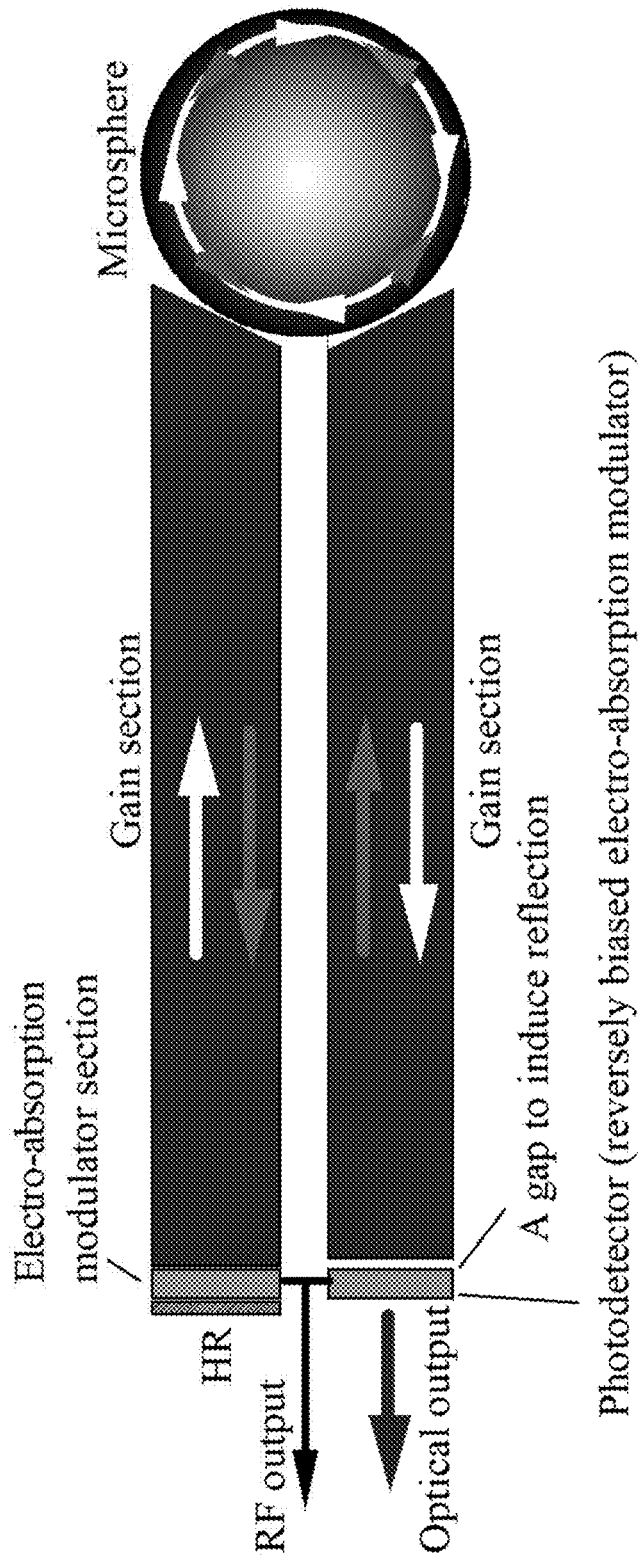
FIG. 16 shows an example of coupled optoelectronic oscillator (COEO) on a chip. The microsphere is an example micro-resonator. Other types of micro-resonators can also be used. The oscillation frequency can be tuned by tuning the resonant frequency of the micro-resonator by either applying a voltage or by changing its temperature. The COEO chip can be made with InGaAs technology.

FIG. 16 is an example of a coupled optoelectronic oscillator (COEO) that is integrated on a chip. The microsphere is an example micro-resonator. Other types of micro-resonators can also be used. The oscillation frequency can be tuned by tuning the resonant frequency of the micro-resonator by changing an operating condition of the micro-resonator, e.g., applying a voltage on the resonator that exhibits an opto-electro effect to change a refractive index of the resonator, a mechanical force to change a dimension of the resonator, or by changing its temperature.

The COEO can be formed over a substrate such as a semiconductor substrate and can include a semiconductor optical modulator formed on the substrate to modulate an optical beam in response to an electrical modulation signal. The COEO in FIG. 16 includes a first waveguide formed on the substrate having a first end that is to receive a modulated optical signal from the optical modulator, and a second end that has an angled facet coupled to the micro-resonator via evanescent coupling, a second waveguide formed on the substrate and having a first end with an angled facet which is coupled to the microresonator via evanescent coupling, and a semiconductor photodetector formed on the substrate to receive and convert an optical output from the second waveguide into an electrical signal. In addition, an electrical link is formed on coupled between the photodetector and the optical modulator to produce the electrical modulation signal from the electrical signal. At least part of the first and second waveguides is doped to produce an optical gain to produce a laser oscillation in a laser cavity formed by the optical waveguides and the microresonator.

The COEO in FIG. 16 for LiDAR systems is an integrated COEO that includes a high-Q optical resonator in an electrically controllable feedback loop. An electro-optical modulator is provided to modulate an optical signal in response to at least one electrical control signal. At least one opto-electronic feedback loop, having an optical part and an electrical part, is coupled to the electro-optical modulator to produce the electrical control signal as a positive feedback. The electrical part of the feedback loop converts a portion of the modulated optical signal that is coupled to the optical part of the feedback loop into an electrical signal and feeds at least a portion of it as the electrical control signal to the electro-optical modulator. The high-Q optical resonator may be disposed in the optical part of the opto-electronic feedback loop or in another optical feedback loop coupled to the opto-electronic feedback loop, to provide a sufficiently long energy storage time and hence to produce an oscillation of a narrow linewidth and low phase noise. The mode spacing of the optical resonator is equal to one mode spacing, or a multiplicity of the mode spacing, of the opto-electronic feedback loop. In addition, the oscillating frequency of the OEO is equal to one mode spacing or a multiple of the mode spacing of the optical resonator. The optical resonator may be implemented in a number of configurations, including, e.g., a Fabry-Perot resonator, a fiber ring resonator, and a microsphere resonator operating in whispering-gallery modes. These and other optical resonator configurations can reduce the physical size of the OEO devices and allow integration of an OEO with other photonic devices and components in a compact package such as a single semiconductor chip.

The above disclosed WDM LiDAR technology can be implemented in various configurations. Some design examples are listed below.

For example, a wavelength division multiplexed (WDM) LiDAR system includes a transmitter unit (TU) which generates a combined optical beam with different wavelengths coupled into a single optical fiber and then passes through an optical modulation device; a fiber optic circulator with a first port connecting to the optical switch device to direct the combined beam of different wavelengths received from the optical switch to a beam forming unit (BFU) connected to the second port of the optic circulator with a fiber optic connector; a wavelength demultiplexing device in the beam forming unit to receive the combined beam, separate the combined beam into different beams according to their wavelengths, and direct the different beams of different wavelengths into different directions in space; a receiver unit (RU) connected with a third port of the optic circulator receives reflected light beams of different wavelengths from the BFU and demultiplexes them into different optical paths to be received by different photodetectors followed by amplifiers and electronic circuitry; a modulation signal generator with a system clock in the receiver unit generates a modulation signal connected to the optical modulation device to modulate the combined light beams; and a signal processing circuit uses the system clock and received signals from different photodetectors to determine the distances of reflections in the paths of the optical beams of different wavelengths. FIG. 2 shows a specific example of this design. In some implementations, the transmitter unit in Design 1 includes a wavelength division multiplier and multiple lasers with different wavelengths to generate the combined beam of different wavelengths For another example, a WDM LiDAR system can be implemented by implementing the transmitter unit by including a multi-wavelength optical source as illustrated by the example in FIG. 3. In implementations, the multi-wavelength source may include a mode-locked laser (FIG. 3) a coupled opto-electronic oscillator (COEO) (FIG. 4).

In implementing an optical transmitter with the optical modulation device, the optical modulation device can include an electro-optic modulator or electro-absorption modulator or a semiconductor optical amplifier.

In implementing a WDM LiDAR system, the optical transmitter may be in an integrated configuration in which the lasers for producing light at the different WDM wavelengths, the wavelength division multiplexer, the optical switching device and other components can be integrated on a single photonics integrated circuit as shown by an example in FIG. 9A.

In some implementations, the wavelength division multiplexer can be implemented based on various WDM technologies, including, for example, an arrayed waveguide grating, a thin film coated filter, or a diffraction grating.

In some implementations, the beam forming unit in a WDM LiDAR system can be coupled to and rotated by a motor stage to rotate continuously to cover 360 degree azimuths field of view.

In some implementations, the wavelength demultiplexing device in the beam forming unit can include a beam collimator and a diffraction grating to direct light beams of different wavelengths into different directions as shown by the examples in FIGS. 2-8.

In some implementations, the wavelength demultiplexing device inside the beam forming unit is structured and configured to vertically spread the beams of different wavelengths to cover a vertical field of view for the LiDAR operation.

In some implementations, the beam forming unit can include a wavelength division multiplexer coupled to fibers or waveguides carrying the different WDM beams in which the tips of fibers or waveguides are arranged in a one dimensional array and each fiber or waveguide tip is placed in the focal plane of an array of different lenses in one dimensional array with a fiber or waveguide being at a defined offset from the center line of a corresponding lens to collectively form an one dimensional beam spread. FIG. 9C shows one such an example.

In some implementations, the wavelength demultiplexing device in the beam forming unit can include a wavelength division multiplexer coupled to the tips of fibers or waveguides arranged in a one dimensional array for respectively carrying different WDM channels and the tips of the waveguides or fibers are placed in the focal plane of a common lens to form a one dimensional beam spread as shown in the example in FIG. 9D.

In some implementations, the beam forming unit can include a wavelength division multiplexer coupled to the tips of fibers arranged in a two dimensional array and the tips are placed in the focal plane of a common lens to form a cluster of beams of different wavelengths and pointing angles with a two dimensional beam spread. This is shown in the example in FIG. 10.

Some implementations of a WDM LiDAR system can include more than one beam forming units to form more than one clusters of beams of different wavelengths and different pointing angles, together with the corresponding transmitter units and receiver units to increase the azimuth field of view or vertical field of view without moving beams. Two examples are shown in FIGS. 11A and 11B.

In some implementations, the receiver unit can include an optional optical amplifier to amplify received reflected light beams and a wavelength division demultiplexer to separate reflected light beams of different wavelengths into different photodetectors. The wavelength division demultiplexing device may be structured to include a diffraction grating and a focusing lens to focus beams of different wavelengths to the corresponding photodetectors in a detector or an array of detectors such as a CCD array. See the example in FIG. 5. The optical amplifier, the wavelength division demultiplexer, the photodetectors may be integrated on a single photonics integrated circuit, as illustrated by the example in FIG. 9B. Also, the wavelength division demultiplexer can be implemented by using various technologies, including, for example, an arrayed waveguide grating, a diffraction grating, or a thin film filter coating.

In some implementations of the WDM LiDAR systems, the modulation signal generator can be used to generate short pulses to modulate the combined optical beam via the optical switching device. See the examples in FIGS. 2 and 3. The modulation signal generator may generate a sinusoidal signal of linearly varying frequencies to modulate the combined optical beam via the optical switching device as shown by examples in FIGS. 6 and 7.

In some implementations, the signal processing unit is operated to determine the distances of reflections by comparing the timing difference between the system clock and received signals in the receiver unit. See the examples in FIGS. 2 and 3.

In some implementations, the signal processing unit is operated to determine the distances of reflections by mixing the received signal from a photodetector in the receiver unit with the sinusoidal signal of linearly varying frequencies in a mixer, passing the output from the mixer through a low pass filter, and taking FFT with the filtered signal. See the examples in FIGS. 6 and 7.

In some implementations, the beam forming unit can include an optical connector connecting the optical circulator and the beam forming unit in form of a rotary connector as shown in the examples in FIGS. 2-8.

In some implementations, a signal processor is operated to calculate and obtain a 3-dimensional point cloud map using the information of the identification of photodetectors designated to the different WDM wavelength channels, the motor encoder angle, and the distances of the reflections.

The disclosed technology can be used to provide a method a LiDAR system without beam scanning as illustrated in examples shown in FIGS. 2-8. Such a method can include generating a combined optical beam with more than one defined wavelengths and directing it to an optical modulation device; modulating the combined optical beam with a modulation signal referenced to a system clock; receiving the modulated combined optical beam and demultiplexing the combined beam with a first wavelength division multiplexing/demultiplexing device into different beams according to their wavelengths; Sending different beams of different wavelengths into different directions in space to be reflected as reflected beams; multiplexing reflected beams using the first wavelength division multiplexing device into a second combined beam and sensing it to a receiving unit; and separating the second combined beam into different optical paths according to wavelengths and routing the separated beams at the different wavelengths into different photoreactors with a second wavelength division multiplexing device to produce different detector signals, with each photodetector labeled with a photodetector number corresponding to a designated wavelength. This method further includes Processing the detector signals together with the system clock to determine the distances of reflections and combining the information of the photodetector number and reflection distance to determine the position of the reflections in space and obtaining the corresponding point cloud map.

In some implementations of the above method, the operation for generating a combined beam with more than one defined wavelength can use a wavelength division multiplexing device to multiplex lasers with different wavelengths into a single optical fiber or waveguide (e.g., FIGS. 2,6); the operation for generating a combined beam with more than one defined wavelength can be based on various technologies, including, for example, a multi-wavelength laser source, a mode-locked laser, a frequency comb, or a coupled opto-electronic oscillator (e.g., FIGS. 3-5); the wavelength multiplexing may be achieved via various technologies, including, for example, using an arrayed waveguide grating, a diffraction grating, or a thin film coated filter; the sinusoidal modulation with a linear frequency chirp may be generated by an opto-electronic oscillator configuration; the pulses may be generated by a coupled opto-electronic oscillator configuration; the step of sending different beams of different wavelengths into different directions in space may be accomplished by a fiber optic collimator followed by a diffraction grating (e.g., FIGS. 2-8); and the step of sending different beams of different wavelengths into different directions in space may be accomplished by the following sub-steps: demultiplexing the combined beam into different optical fibers or waveguides; arranging the tips of the optical fibers or the waveguides in a 2-dimensional array; placing the 2-dimensional array in the focal plane of a lens. (FIGS. 9-11)

In some implementations of the disclosed WDM LiDAR systems or methods, the system clock can be generated by an electronic oscillator, an opto-electronic oscillator, or a coupled opto-electronic oscillator (e.g., FIGS. 2-8); or the modulation signal may be in one of the following format: short pulses, sinusoidal modulation with a linear frequency chirp, OKK, return-to-zero, duel binary, DPSK, QPSK, or PAM4.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is what is described or illustrated, including:

1. A light detection and ranging (LiDAR) system, comprising:
   an optical transmitter module to produce probe light at different optical wavelengths that can be used for wavelength division multiplexing (WDM);
   an optical fiber link coupled to the optical transmitter module to receive the probe light;
   an optical beamforming module coupled to receive the probe light from the optical fiber link and operable to separate the probe light into different optical probe beams at the different WDM wavelengths and to project the different optical probe beams to different directions for LiDAR sensing;
   a motor engaged to cause the optical collimator and the optical diffraction grating to rotate together to scan the different optical probe beams at different beam directions and at the different WDM wavelengths for LiDAR sensing while maintaining optical alignment with each other that are aligned relative to each other;
   an optical receiver module coupled to receive returned probe light via the fiber link from the optical beamforming module and including a WDM demultiplexer to separate the returned probe light into the different returned optical probe beams at the different WDM wavelengths, respectively, and different optical detectors that are placed to receive and detect the different returned optical probe beams at the different WDM wavelengths, respectively; and
   an optical circulator coupled to the optical fiber link, the optical transmitter module, the optical receiver module and the optical beamforming module to direct light from the optical transmitter module to the optical beamforming module, light from the beamforming module to the optical receiver module.

2. The LiDAR system as in claim 1, wherein:
   the optical beamforming module includes an optical collimator and an optical diffraction grating that are aligned relative to each other to transmit light there between so that the probe light from the optical transmitter module is received by the optical collimator and is directed by the optical collimator to the optical diffraction grating that separates the probe light into the different optical probe beams at the different WDM wavelengths, respectively, at different beam directions, and
   wherein the optical beamforming module further receives returned probe light and directs the returned probe light from the optical diffraction grating to the optical collimator.

3. The LiDAR system as in claim 1, wherein the optical beamforming module includes a WDM demultiplexer that separates the probe light from the optical transmitter module into the different optical probe beams at the different WDM wavelengths, respectively, different optical waveguides or fiber lines coupled to receive the different optical probe beams at the different WDM wavelengths, respectively, a lens array of optical lenses that are respectively coupled to the optical waveguides or fibers with varying spatial offsets to optic axes of the optical lenses to cause the lenses to project received optical probe beams at different output beam directions, and wherein the optical beamforming module further receives returned probe light and directs the returned probe light to the WDM demultiplexer via the different optical waveguides or fiber lines to be combined in the optical fiber link.

4. The LiDAR system as in claim 1, wherein the optical beamforming module includes
- a WDM demultiplexer that separates the probe light into the different optical probe beams at the different WDM wavelengths, respectively,
- different optical waveguides or fiber lines coupled to receive the different optical probe beams at the different WDM wavelengths, respectively,
- an optical lens that is coupled to the optical waveguides or fiber lines with varying spatial offsets to an optic axis of the optical lens to cause the optical lens to project received optical probe beams at different output beam directions, and
- wherein the optical beamforming module further receives returned probe light via the optical lens and directs the returned probe light to the WDM demultiplexer via the different optical waveguides or fiber lines to be combined in the optical fiber link.

5. The LiDAR system as in claim 1, further comprising an optical switch coupled between the optical transmitter and the fiber link and operable to turn on and off the probe light in response to a local oscillator signal.

6. The LiDAR system as in claim 5, wherein the optical switch includes an optical semiconductor amplifier.

7. The LiDAR system as in claim 5, wherein the optical switch includes an electro-absorption modulator.

8. The LiDAR system as in claim 5, wherein the optical switch includes an electro-optical modulator.

9. The LiDAR system as in claim 1, wherein the optical receiver unit includes a local oscillator circuit to produce a local oscillator signal which provides timing for the different detectors in the optical receiving module.

10. The LiDAR system as in claim 1, wherein the optical transmitter module outputs a string of optical pulses of multiple WDM wavelengths.

11. The LiDAR system as in claim 1, wherein the optical transmitter module includes an electo-optic modulator to modulate the probe light in response to a microwave or RF signal of a varying frequency.

12. The LiDAR system as in claim 11, wherein the optical receiver unit includes a signal mixer that mixes the microwave or RF signal with the received signals from different detectors to obtain beat signals at different frequencies in relation to reflections from different distances.

13. The LiDAR system as in claim 1, wherein the optical transmitter module includes a mode-locked laser.

14. The LiDAR system as in claim 1, wherein the optical transmitter module includes an optical frequency comb generator.

15. The LiDAR system as in claim 1, wherein the optical transmitter module includes a coupled opto-electronic oscillator.

16. The LiDAR system as in claim 1, wherein the optical transmitter module includes multiple semiconductor lasers and a WDM multiplexer that combine laser beams from the lasers into the probe light to be transmitted to the optical beam forming unit.

17. The LiDAR system as in claim 1, wherein the optical transmitter module includes a frequency tunable opto-electronic oscillator (OEO).

18. The LiDAR system as in claim 1, wherein the optical transmitter module includes a frequency tunable coupled opto-electronic oscillator (COEO).

19. The LiDAR system as in claim 18, wherein the OEO is configured to output a reference signal to mix with the signals from the photodetectors.

20. The LiDAR system as in claim 1, wherein the optical beamforming module includes:
- a WDM demultiplexer to receive the probe light from the fiber link and to separate the receive probe light into different optical probe beams at the different WDM wavelengths;
- different optical waveguides or fiber lines coupled to receive the different optical probe beams at the different WDM wavelengths from the WDM demultiplexer to include output terminals that form a 2 dimensional array;
- an optical lens located to have a focal plane at or near the 2-dimensional array of the output terminals to receive output light from the optical waveguides or fiber lines to produce and form a cone of optical probe beams at different output beam directions, and wherein the 2-dimensional array further receives returned probe light via the optical lens and directs the returned probe light to the WDM demultiplexer via the different optical waveguides or fiber lines to be combined in the optical fiber link.

21. The LiDAR system as in claim 1, wherein the optical transmitter module includes:
- different lasers to produce laser light at different wavelength division multiplexed (WDM) wavelengths;
- a WDM multiplexer coupled to receive the laser light from the different lasers to combine the laser light at different wavelength division multiplexed (WDM) wavelengths into a single WDM beam; and
- an opto-electronic oscillator that includes an electrically controllable optical modulator coupled to receive the single WDM beam output by the WDM multiplexer, an opto-electronic feedback loop that comprises an optical part and an electrical part interconnected by a photodetector to receive a portion of the modulated optical output from the optical modulator and to convert the modulated optical output into an electrical signal to control the optical modulator so that the modulated optical output is modulated to carry an electrical RF or microwave oscillation signal at a radio frequency or microwave frequency, wherein the opto-electronic feedback loop is structured to feed the electrical signal in phase to the optical modulator to generate and sustain both optical modulation and electrical oscillation at the radio frequency or microwave frequency,
- wherein a portion of the modulated optical output from the optical modulator of the opto-electronic oscillator is output as the probe light which combines light at different wavelength division multiplexed (WDM) wavelengths.

22. The LiDAR system as in claim 1, wherein the optical transmitter module includes:
- an active laser feedback loop with a first loop gain greater than unity and a first loop delay to generate a laser oscillation and including an electro-optical gain element that is operable to affect the first loop gain; and
- an opto-electronic feedback loop coupled with the active laser feedback loop, having a second loop gain greater than unity and a second loop delay greater than the first loop delay, wherein the opto-electronic loop includes an optical delay line having one end coupled to the active laser feedback loop to receive an optical signal indicative of the laser oscillation and another end connected to a photodetector that converts said optical signal into an electrical modulation signal, an RF delay line having one end connected to the photodetector to receive the electrical modulation signal and another end connected to the electro-optical gain element, and an RF bandpass filter connected in the RF delay line, having a center frequency that is substantially equal to a RF beat frequency of different modes of the active laser feedback loop, whereby the active laser feedback loop is mode-locked to produce pulsed laser oscillations.

23. The LiDAR system as in claim 22, wherein the active laser feedback loop includes fiber to form an optical ring.

24. The LiDAR system as in claim 22, wherein the active laser feedback loop includes one or more optical waveguides to form an optical ring.

25. The LiDAR system as in claim 1, wherein the optical transmitter module includes:
a substrate;
a coupled opto-electronic oscillator formed on or over the substrate to include:
 a semiconductor optical modulator to modulate an optical beam in response to an electrical modulation signal;
 an optical microresonator formed on or over the substrate;
 a first waveguide formed on or over the substrate having a first end to receive a modulated optical signal from the optical modulator, and a second end that has an angled facet coupled to the microresonator via evanescent coupling,
 a second waveguide formed on or over the substrate and having a first end with an angled facet which is coupled to the microresonator via evanescent coupling,
 a semiconductor photodetector formed on or over the substrate to receive and convert an optical output from the second waveguide into an electrical signal, and
 an electrical link coupled between the photodetector and the optical modulator to produce the electrical modulation signal from the electrical signal, wherein at least part of the first and second waveguides is doped to produce an optical gain to produce a laser oscillation in a laser cavity formed by the optical waveguides and the microresonator.

26. The LiDAR system as in claim 1, wherein:
the optical beamforming module includes a WDM demultiplexer that separates the probe light from the optical transmitter module into the different optical probe beams at the different WDM wavelengths, respectively, different optical waveguides or fiber lines coupled to receive the different optical probe beams at the different WDM wavelengths, respectively, a lens array of optical lenses with optical axes pointing at different directions that are respectively coupled to the optical waveguides or fibers to project received optical probe beams at different output beam directions, and wherein the optical beamforming module further receives returned probe light and directs the returned probe light to the WDM demultiplexer via the different optical waveguides or fiber lines to be combined in the optical fiber link.

27. The LiDAR system as in claim 1, comprising:
a rotary fiber optic connector that connects the optical beamforming module with the optic fiber link to allow the optical beamforming module to freely rotate.

28. The LiDAR system as in claim 1, wherein:
the optical receiver module includes a diffraction grating as the wavelength division demultiplexer, a photodetector array to receive light beams of different wavelengths from the grating, and a lens system to focus the light beams of different wavelengths into the different photodetectors.

29. A light detection and ranging (LiDAR) system, comprising:
different substantially identical optical transmitter modules, each producing an optical beam combining light at a set of different wavelength division multiplexed (WDM) wavelengths;
different optical fiber links coupled to the optical transmitter modules to receive, respectively, the different optical beams;
different optical beamforming modules located at different positions and coupled to the different optical fiber links, respectively, each optical beamforming module located and oriented to project an optical beam from one coupled optical fiber link as a 3-dimensional cone of different probe beams at the different WDM wavelengths, respectively, for LiDAR sensing, wherein the different optical beamforming modules at the different locations are oriented to project respective 3-dimensional cone of different probe beams at the different WDM wavelengths at different directions for LiDAR sensing and to receive returned probe light; and
different optical receiver modules respectively coupled to receive returned probe light via the different fiber links from the different optical beamforming modules and including a WDM demultiplexer to separate the returned probe light into the different returned optical probe beams at the different WDM wavelengths, respectively, and different optical detectors that are placed to receive and detect the different returned optical probe beams at the different WDM wavelengths, respectively,
wherein each optical beamforming module includes (1) an optical WDM demultiplexer coupled to a corresponding optical fiber link to separate received return probe light into the different optical probe beams at the different WDM wavelengths, respectively, (2) an array of fiber lines or waveguides coupled to receive, from the optical WDM demultiplexer, the different optical probe beams at the different WDM wavelengths, respectively, (3) a projection lens located to receive, from the array of fiber lines or waveguides, the different optical probe beams at the different WDM wavelengths to project the received different optical probe beams at the different WDM wavelengths out as a 3-dimensional cone of probe beams for LiDAR sensing while maintaining optical beamforming module at a fixed position without moving any part of optical beamforming module for the LiDAR sensing.

30. The LiDAR system as in claim 29, wherein each optical transmitter module includes:
different lasers to produce laser light at different wavelength division multiplexed (WDM) wavelengths;
a WDM multiplexer coupled to receive the laser light from the different lasers to combine the laser light at different wavelength division multiplexed (WDM) wavelengths into a single WDM beam; and an opto-electronic oscillator that includes an electrically controllable optical modulator coupled to receive the single WDM beam output by the WDM multiplexer, an opto-electronic feedback loop that comprises an optical part and an electrical part interconnected by a photodetector to receive a portion of the modulated optical output from the optical modulator and to convert the modulated optical output into an electrical signal to control the optical modulator so that the modulated optical output is modulated to carry an electrical RF or microwave oscillation signal at a radio frequency or microwave frequency, wherein the opto-electronic feedback loop is structured to feed the electrical signal in phase to the optical modulator to generate and sustain both optical modulation and electrical oscillation at the radio frequency or microwave frequency, wherein a portion of the modulated optical output from the optical modulator of the opto-electronic oscillator is output as the probe light which combines light at different wavelength division multiplexed (WDM) wavelengths.

31. The LiDAR system as in claim 29, wherein each optical transmitter module includes:

an active laser feedback loop with a first loop gain greater than unity and a first loop delay to generate a laser oscillation and including an electro-optical gain element that is operable to affect the first loop gain; and an opto-electronic feedback loop coupled with the active laser feedback loop, having a second loop gain greater than unity and a second loop delay greater than the first loop delay, wherein the opto-electronic loop includes an optical delay line having one end coupled to the active laser feedback loop to receive an optical signal indicative of the laser oscillation and another end connected to a photodetector that converts said optical signal into an electrical modulation signal, an RF delay line having one end connected to the photodetector to receive the electrical modulation signal and another end connected to the electro-optical gain element, and an RF bandpass filter connected in the RF delay line, having a center frequency that is substantially equal to a RF beat frequency of different modes of the active laser feedback loop, whereby the active laser feedback loop is mode-locked to produce pulsed laser oscillations.

32. The LiDAR system as in claim 31, wherein the active laser feedback loop includes fiber to form an optical ring.

33. The LiDAR system as in claim 31, wherein the active laser feedback loop includes one or more optical waveguides to form an optical ring.

34. The LiDAR system as in claim 29, wherein each optical transmitter module includes:

a substrate;

a coupled opto-electronic oscillator formed on or over the substrate to include:

a semiconductor optical modulator to modulate an optical beam in response to an electrical modulation signal;

an optical microresonator formed on or over the substrate;

a first waveguide formed on or over the substrate having a first end to receive a modulated optical signal from the optical modulator, and a second end that has an angled facet coupled to the microresonator via evanescent coupling, a second waveguide formed on or over the substrate and having a first end with an angled facet which is coupled to the microresonator via evanescent coupling, a semiconductor photodetector formed on or over the substrate to receive and convert an optical output from the second waveguide into an electrical signal, and an electrical link coupled between the photodetector and the optical modulator to produce the electrical modulation signal from the electrical signal, wherein at least part of the first and second waveguides is doped to produce an optical gain to produce a laser oscillation in a laser cavity formed by the optical waveguides and the microresonator.

* * * * *